(12) United States Patent
Kawamoto et al.

(10) Patent No.: US 8,165,298 B2
(45) Date of Patent: Apr. 24, 2012

(54) QUANTUM CRYPTOGRAPHY COMMUNICATION APPARATUS AND COMMUNICATION TERMINAL

(75) Inventors: Yohei Kawamoto, Kanagawa (JP); Takuya Hirano, Tokyo (JP); Kuninori Shino, Tokyo (JP); Masakazu Ukita, Kanagawa (JP)

(73) Assignee: Sony Corporation, Tokyo (JP)

(*) Notice: Subject to any disclaimer, the term of this patent is extended or adjusted under 35 U.S.C. 154(b) by 1072 days.

(21) Appl. No.: 12/032,560

(22) Filed: Feb. 15, 2008

(65) Prior Publication Data

US 2008/0267635 A1    Oct. 30, 2008

(30) Foreign Application Priority Data

Feb. 19, 2007 (JP) ................. 2007-037389

(51) Int. Cl.
H04K 1/00 (2006.01)
(52) U.S. Cl. ........ 380/256; 380/255; 359/237; 398/140; 398/141; 398/142; 398/202; 398/203
(58) Field of Classification Search ............... 380/256, 380/255; 359/237; 398/140, 141, 142, 202, 398/203
See application file for complete search history.

(56) References Cited

U.S. PATENT DOCUMENTS

| | | | | |
|---|---|---|---|---|
| 6,438,234 | B1 * | 8/2002 | Gisin et al. | 380/256 |
| 7,305,091 | B1 * | 12/2007 | Hirano | 380/255 |
| 7,365,858 | B2 * | 4/2008 | Fang-Yen et al. | 356/489 |
| 7,627,126 | B1 * | 12/2009 | Pikalo et al. | 380/279 |
| 2005/0168752 | A1 * | 8/2005 | Bell et al. | 356/482 |

FOREIGN PATENT DOCUMENTS

| | | |
|---|---|---|
| JP | 2000-517499 | 12/2000 |
| JP | 2002-287105 | 10/2002 |
| JP | 2005268958 | 9/2005 |
| JP | 2005-286485 | 10/2005 |
| JP | 2007-251679 | 9/2007 |
| JP | 2007-300515 | 11/2007 |

OTHER PUBLICATIONS

W. Tittel, J.; Quantum Cryptography using entangled photons in energy-time Bell states; Year:200; Unversity of Geneva; pp: 1-4.*
http://www1.ipdl.inpit.go.jp/RS1_E/cgi-bin/RS1P400.cgi/1101/, Dec. 23, 2011.*
Appl. Phys. Lett., 70, 793 (1997).
Quantuminf. and Comp., 6326 (2006).
Appl. Phys. Lett., 86 011103 (2005).
Japanese Office Action issued on Mar. 3, 2009, for corresponding Japanese Patent Application JP 2007-037389.
Honjo, T. et al., "Plug & Play-QKD scheme using a frequency shifter," NTT Basic Research Labs, 2004.

* cited by examiner

*Primary Examiner* — April Shan
(74) *Attorney, Agent, or Firm* — K&L Gates LLP

(57) ABSTRACT

In a quantum cryptography communication apparatus, a light pulse is generated by a light source and split into a signal light pulse and a reference light pulse on a receiving side. The signal light pulse and the reference light pulse are transmitted to a sending side via a communication channel. On the sending side, the received reference light is passed through a first optical path and phase-modulated by a randomly selected amount. Communication information is acquired on the basis of the reference light passed through the first optical path and the signal light passed via a second optical path. Frequencies of the signal light pulse and the reference light pulse are shifted. The intensity of the signal light pulses is attenuated and phase-modulated by an amount corresponding to the communication information. The resultant signal light pulse and the reference light pulse are returned back to the receiving side.

6 Claims, 23 Drawing Sheets

MAGNITUDE AND DIRECTION OF FREQUENCY SHIFT

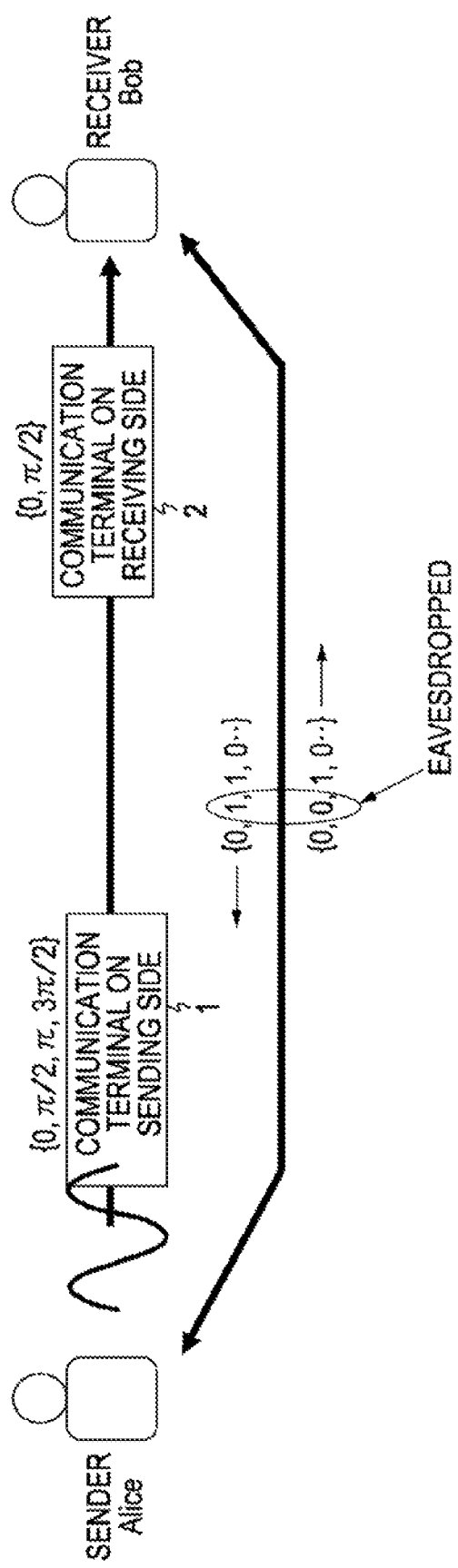

| | | ○ | ◎ | ○ | ○ | ◎ (dashed) |
|---|---|---|---|---|---|---|
| (A) | AMOUNT OF PHASE MODULATION (φA) AT SENDER | 0 | 90 (π/2) | 180 (π) | 270 (3π/2) | |
| (B) | AMOUNT OF PHASE MODULATION (φB) AT RECEIVER | X1 0 | X2 π/2 | X1 0 | X2 π/2 | X1 0 | X2 π/2 | X1 0 | X2 π/2 |
| (C) | DETECTED BIT AND EQUALITY/ INEQUALITY IN BASIS | 1 EQUAL IN BASIS | × UNEQUAL IN BASIS | × UNEQUAL IN BASIS | 1 EQUAL IN BASIS | 0 EQUAL IN BASIS | × UNEQUAL IN BASIS | × UNEQUAL IN BASIS | 0 EQUAL IN BASIS |
| (D) | DETECTABLE BIT RATIO (BASIS MATCHING RATIO) | 1/2 (50%) | | | | | | | |

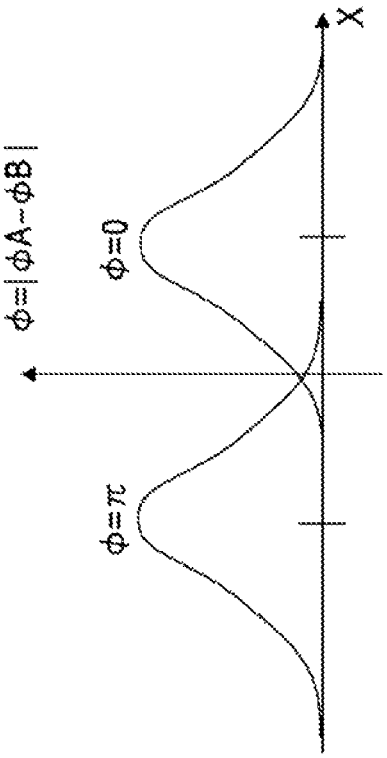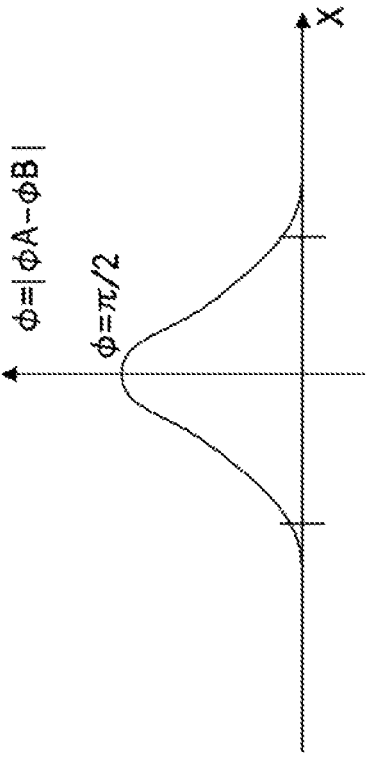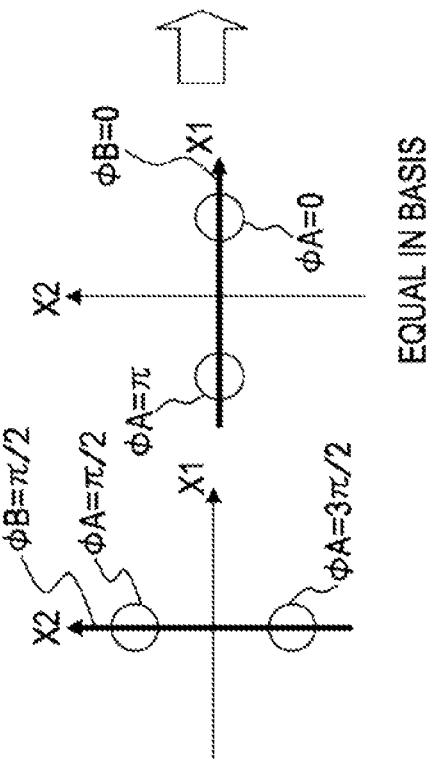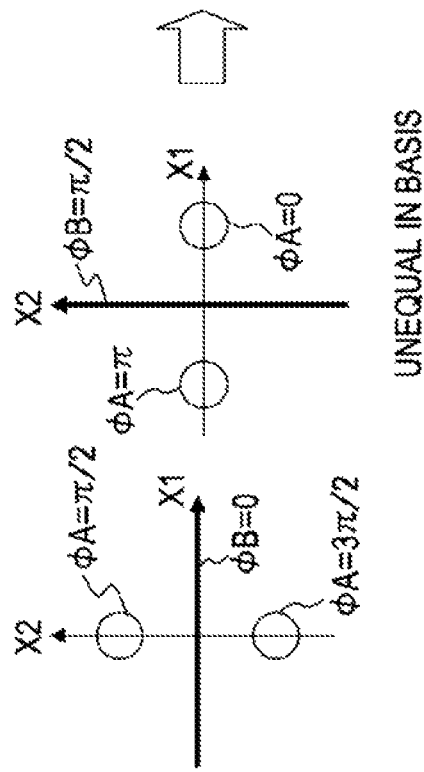

| (A) | PHASE MODULATION (φA) AT SENDER | ◯ 45° | ◯ 135° | ● 225° | ⦾ 315° |
|---|---|---|---|---|---|
| (B) | PHASE MODULATION (φB) AT RECEIVER | X1  0 | X2  $\frac{\pi}{2}$ | X1  0 | X2  $\frac{\pi}{2}$ | X1  0 | X2  $\frac{\pi}{2}$ | X1  0 | X2  $\frac{\pi}{2}$ |
| (C) | SHARED BITS | 1 | 1 | 0 | 0 | 0 | 0 | 1 | 0 |
| (D) | SHARABLE INFORMATION RATIO | 100% | | | | | | | |

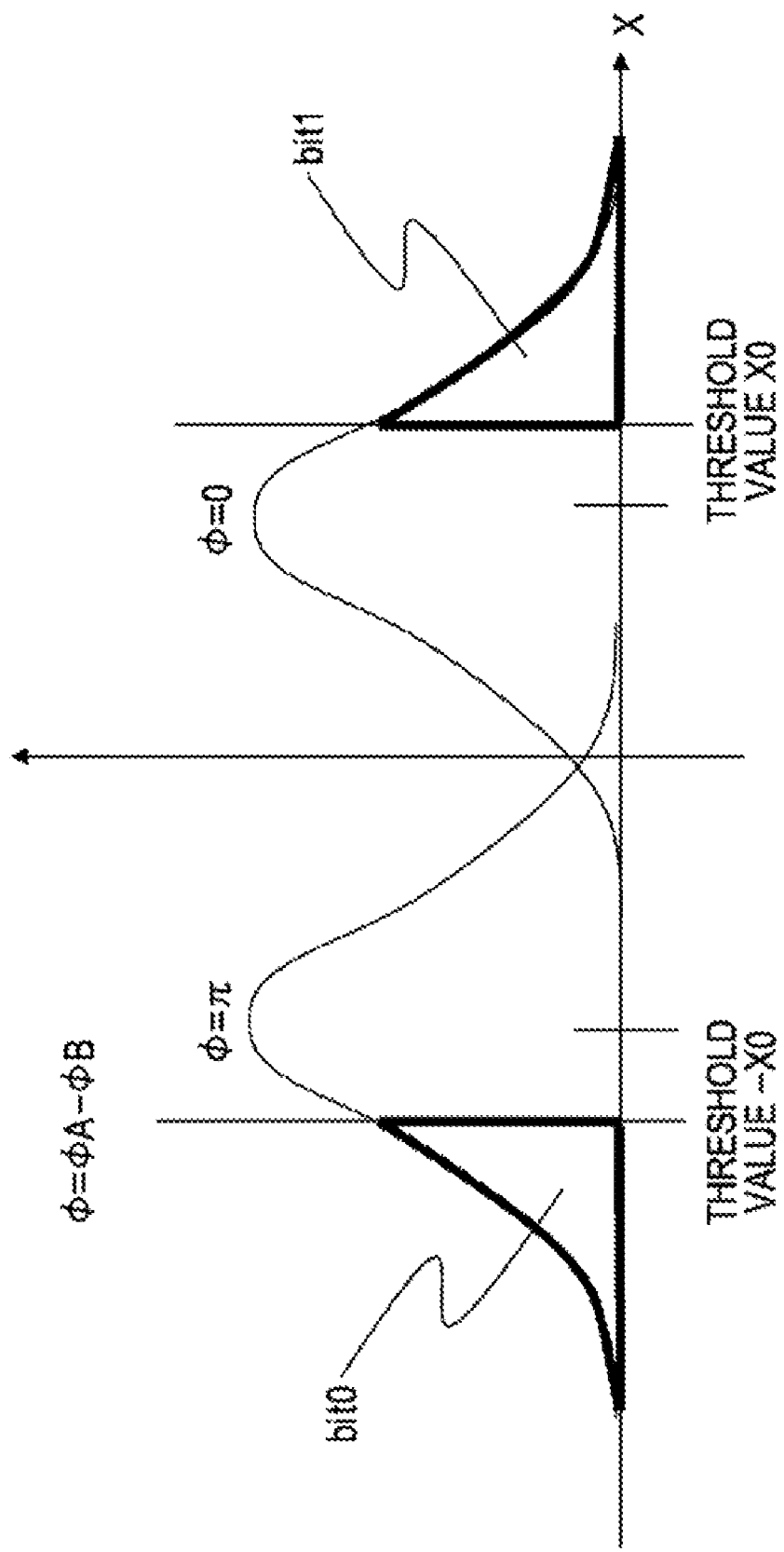

FIG. 18

| | | | | ◎ | | ○ | |
|---|---|---|---|---|---|---|---|
| (A) PHASE MODULATION (φA) AT SENDER | ○ 90° | 0° | −150° | 90° | 120° | 240° | |
| (B) PHASE MODULATION (φB) AT RECEIVER | | −30° | −150° | 90° | −30° | 90° | −30° | −150° |
| (C) SHARED BITS | UNEQUAL IN BASIS | 1 | 0 | 1 | 0 | 0 | UNEQUAL IN BASIS | 1 |
| (D) SHARABLE INFORMATION RATIO | 2/3 (UNEQUAL BASIS RATIO: 1/3) | | | | | | |

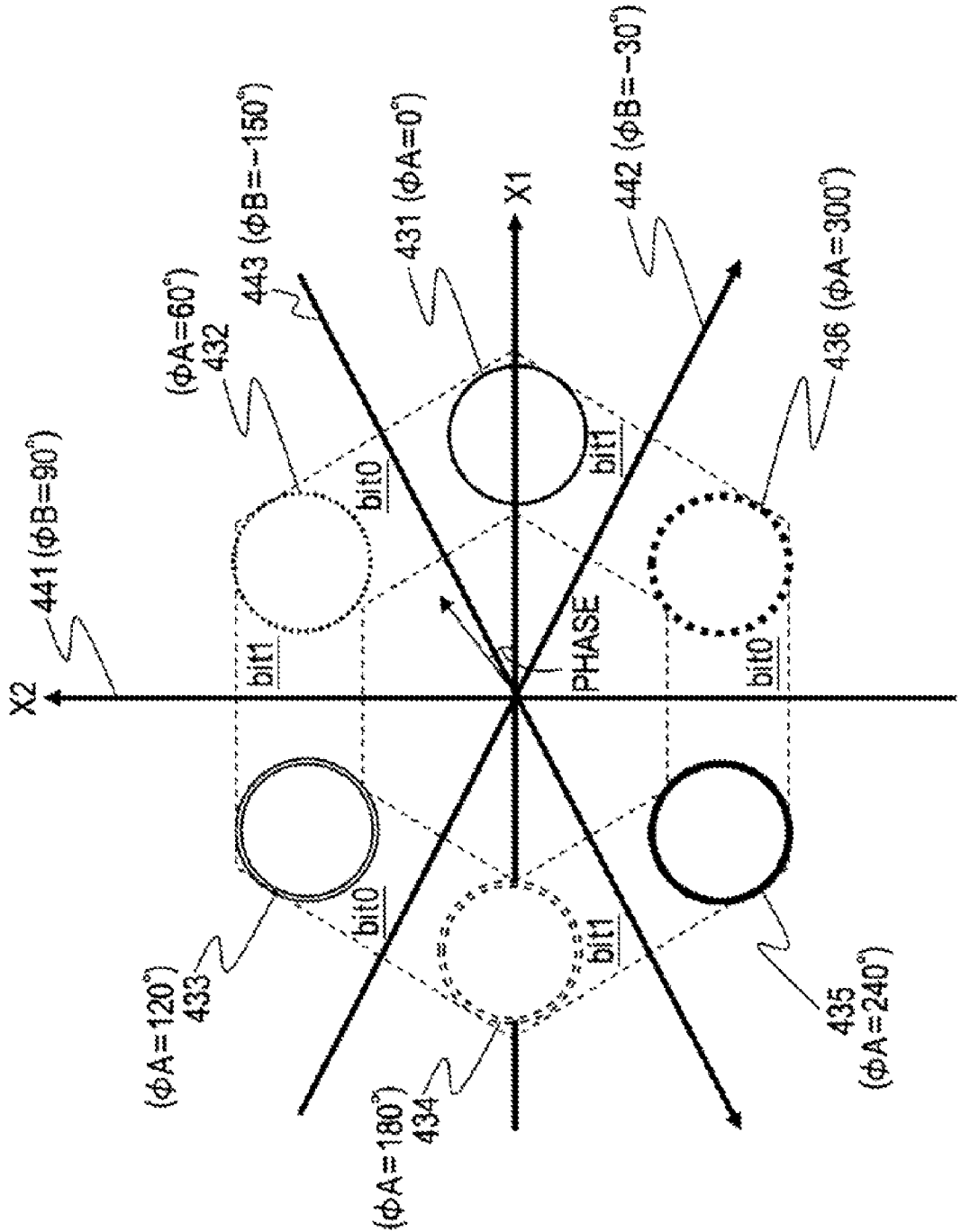

FIG. 20A

| (A) | PHASE MODULATION (φA) AT SENDER | ○ | | ○ | | ◎ | |
|---|---|---|---|---|---|---|---|
| (B) | PHASE MODULATION (φB) AT RECEIVER | 90° | 0° | -30° | -150° | 90° | 60° | -30° | -150° | 90° | 120° | -30° | -150° |
| (C) | SHARED BITS | UNEQUAL IN BASIS | 1 | 0 | UNEQUAL IN BASIS | 1 | 0 | 0 | 1 | UNEQUAL IN BASIS |
| (D) | SHARABLE INFORMATION RATIO | 2/3 (UNEQUAL BASIS RATIO: 1/3) |

FIG. 20B

| (A) | PHASE MODULATION (φA) AT SENDER | ◎ | | ○ | | ◎ | |
|---|---|---|---|---|---|---|---|
| (B) | PHASE MODULATION (φB) AT RECEIVER | 90° | 180° | -30° | -150° | 90° | 240° | -30° | -150° | 90° | 300° | -30° | -150° |
| (C) | SHARED BITS | UNEQUAL IN BASIS | 0 | 1 | UNEQUAL IN BASIS | 0 | 1 | 0 | 1 | UNEQUAL IN BASIS |
| (D) | SHARABLE INFORMATION RATIO | 2/3 (UNEQUAL BASIS RATIO: 1/3) |

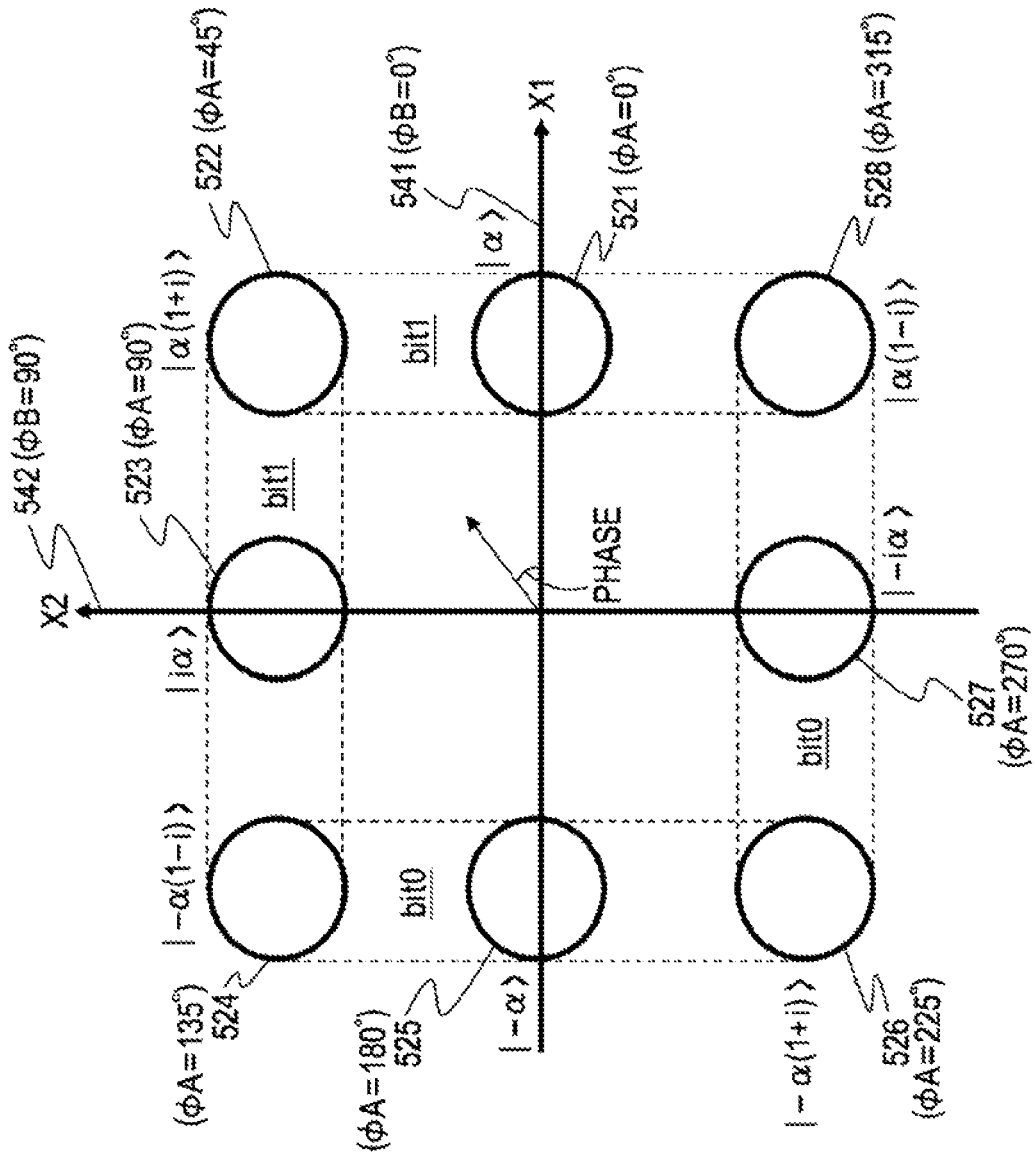

FIG. 22A

| | | | | | | |
|---|---|---|---|---|---|---|
| (A) | PHASE MODULATION (φA) (AND INTENSITY MODULATION) AT SENDER | 0° [1/2] | 45° [1] | 90° [1/2] | 135° [1] |
| (B) | PHASE MODULATION (φB) AT RECEIVER | 0° | 90° | 0° | 90° | 0° | 90° |
| (C) | SHARED BITS | 1 | UNEQUAL IN BASIS | 1 | 1 | UNEQUAL IN BASIS | 1 | 0 | 1 |
| (D) | SHARABLE INFORMATION RATIO | 3/4 [12/16 (UNEQUAL BASIS RATIO: 4/16)] | | | | | |

FIG. 22B

| | | | | | | |
|---|---|---|---|---|---|---|
| (A) | PHASE MODULATION (φA) (AND INTENSITY MODULATION) AT SENDER | 180° [1/2] | 225° [1] | 270° [1/2] | 315° [1] |
| (B) | PHASE MODULATION (φB) AT RECEIVER | 0° | 90° | 0° | 90° | 0° | 90° | 0° | 90° |
| (C) | SHARED BITS | 0 | UNEQUAL IN BASIS | 0 | 0 | UNEQUAL IN BASIS | 0 | 1 | 0 |
| (D) | SHARABLE INFORMATION RATIO | 3/4 [12/16 (UNEQUAL BASIS RATIO: 4/16)] | | | | | |

FIG. 24A

| | | 22.5° | | | 67.5° | | | 112.5° | | | 157.5° | | |
|---|---|---|---|---|---|---|---|---|---|---|---|---|---|
| (A) | PHASE MODULATION (φA) AT SENDER | 0° | | | 0° | | | 0° | | | 0° | | |
| (B) | PHASE MODULATION (φB) AT RECEIVER | 45° | 90° | 135° | 45° | 90° | 135° | 45° | 90° | 135° | 45° | 90° | 135° |
| (C) | SHARED BITS | 1 | 1 | 0 | 1 | 1 | 1 | 0 | 1 | 1 | 0 | 1 | 1 |
| (D) | SHARABLE INFORMATION RATIO | 100% (UNEQUAL BASIS RATIO: 0) | | | | | | | | | | | |

FIG. 24B

| | | 202.5° | | | 247.5° | | | 292.5° | | | 337.5° | | |
|---|---|---|---|---|---|---|---|---|---|---|---|---|---|
| (A) | PHASE MODULATION (φA) AT SENDER | 0° | | | 0° | | | 0° | | | 0° | | |
| (B) | PHASE MODULATION (φB) AT RECEIVER | 45° | 90° | 135° | 45° | 90° | 135° | 45° | 90° | 135° | 45° | 90° | 135° |
| (C) | SHARED BITS | 0 | 0 | 1 | 0 | 0 | 0 | 1 | 0 | 0 | 1 | 0 | 0 |
| (D) | SHARABLE INFORMATION RATIO | 100% (UNEQUAL BASIS RATIO: 0) | | | | | | | | | | | |

QUANTUM CRYPTOGRAPHY COMMUNICATION APPARATUS AND COMMUNICATION TERMINAL

CROSS REFERENCES TO RELATED APPLICATIONS

The present application claims priority to Japanese Patent Application JP 2007-037389 filed in the Japanese Patent Office on Feb. 19, 2007, the entire contents of which are incorporated herein by reference.

BACKGROUND

The present application relates to a quantum cryptography communication apparatus adapted to perform a communication process based on quantum cryptography and also to a communication terminal used in the quantum cryptography communication apparatus. More particularly, the present invention relates to a quantum cryptography communication apparatus having an optical system adapted to transmit and return light, and also having a frequency shifter disposed on a sending side and adapted to shift frequencies of signal light and reference light, wherein the frequency shifter is formed together with a light attenuator for attenuating the intensity level of the signal light in an integral manner by a single acousto-optic device thereby suppressing the adverse effects of backscattered light without causing degradation in performance or reliability of quantum cryptography. The present invention also relates to a communication terminal for use in such a quantum cryptography communication apparatus.

Cryptography is used to transmit information while concealing the information from third parties. Typical cryptographic techniques include public key cryptography using a RSA algorithm, an ElGamal algorithm, etc., and private key cryptography using an AES algorithm, a DES algorithm, etc. The security of the former technique relies on the difficulty in factorization into prime factors and the difficulty in solving discrete logarithm problems. Thus, this cryptography technique is faced with threat of decipherment by quantum computation or other attacks. On the other hand, in the latter technique, a private key needs to be shared by a sender and a receiver in advance. In order to share the private key, the private key is generally exchanged by using the former technique. As with the former cryptography technique, the latter technique is also faced with various attacks, which are making progress day by day. The two cryptography techniques described above rely on the computational security.

Quantum key distribution (QKD) is known as a technique to securely share a private key between two parties. In the QKD, information is carried by a single photon or by weak light obtained by attenuating intensity of laser light. If the information is eavesdropped by a third party, the eavesdropping is detected by the uncertain principle or the no-cloning theorem. This guarantees the security of the QKD.

The QKD can be classified into two types according to the method of detecting weak light. One is single-photon QKD in which a single photon is detected using a single-photon detector realized using an avalanche photodiode (APD) or the like. The other one is continuous variable QKD in which a homodyne detector realized by a photodiode (PD) is used.

Various optical systems for use in the above techniques have been proposed. Of these techniques, much attention has been paid to a plug-and-play technique (see, for example, A. Muller, T. Herzog, B. Huttner, W. Tittel, H. Zbinden, and N. Gisin, Appl. Phys. Lett., 70,793 (1997) and M. Legre, H. Zbinden, and N. Gisin, Quantum Inf. and Comp., 6,326 (2006)). The optical system according to this technique is characterized in that signal light carrying information and reference light for use in detection of the information by interference are passed through the same transmission line twice: once in a forward direction and once in an opposite direction. In this technique, the optical path is selected by using polarization so that the signal light and the reference light travels along the same optical path. This makes it unnecessary to make adjustment of the optical path. Although an optical fiber has large fluctuations in polarization, the fluctuations are cancelled out when light is passed in the forward direction and then in the backward direction. Thus, it is not necessary to made adjustment in terms of polarization.

However, use of the transmission line along which light is passed in the forward direction and the backward direction causes backscattered light generated in the optical fiber to be incident on the detector, and thus the backscattered light functions as noise to the signal light carrying the information (see, for example, D. Subacius, A. Zavriyev, and A. Trifonov, Appl. Phys. Lett., 86, 011103 (2005)).

The APD used in the single-photon QKD reacts to backscattered light even if the backscattered light includes only a single photon. Thus, the backscattered light has a significant adverse influence on detection of the signal light. On the other hand, in the continuous variable QKD, scattered light can interfere with reference light with high intensity compared with the intensity of signal light, and, as a result, noise is generated. To avoid the above problems, it is known to reduce the repletion frequency at which light pulses are emitted from a light source so that backscattered light is not incident on the detector when the signal light is incident on the detector, or the above problems are avoided by transmitting a pulse sequence at equal intervals. However, in the techniques described above, the information transmission rate decreases with the transmission length.

For example, Japanese Unexamined Patent Application Publication No. 2005-268958 discloses a technique in which a frequency shifter (which is a phase modulator driven b, an RF signal with a fixed frequency f1) is disposed on a sending side, and a filter which allows only light with a particular frequency is disposed in front of a photon detector on a receiving side thereby to suppress the influence of backscattered light.

The technique disclosed in Japanese Unexamined Patent Application Publication No. 2005-268958 has the following problems.

1. In quantum cryptography, measurement is performed by interfering signal light having a low intensity with reference light having a high intensity. However, the frequency shifter (light phase modulator) additionally disposed in the optical path causes a reduction in the intensity of the reference light, which results in an increase in excess noise in the measurement performed on the receiving side, and thus a reduction in security or reliability of quantum cryptography.

2. To drive the frequency shifter (light phase modulator), an additional control signal is necessary. This results in an increase in power consumption and an increase in complexity of the apparatus.

3. The frequency shifter (light phase modulator) additionally disposed in the optical path results in an increase in fluctuation of transmittance, which can adversely influence the performance of the quantum cryptography using weak light.

SUMMARY

In view of the above, it is desirable to provide a technique to avoid adverse effects of backscattered light without degrading the security or performance of quantum cryptography.

In view of the above, according to an embodiment, there is provided a quantum cryptography communication apparatus adapted to perform a communication process based on quantum cryptography, comprising a communication terminal on a receiving side, a communication terminal on a sending side, and a communication channel connecting the communication terminal on the receiving side and the communication terminal on the sending side. In this quantum cryptography communication apparatus, the communication terminal on the receiving side includes a light source adapted to generate a light pulse, a light beam splitter adapted to split the light pulse generated by the light source into signal light and reference light, a first optical path, a second optical path, a delay unit disposed in the first optical path or the second optical path, a first light transmitting unit adapted to transmit the signal light and the reference light over the communication channel, the signal light having been output from the light beam splitter and having been passed via the first path, the reference light having been output from the light beam splitter and having been passed via the second optical path, a light separator adapted to receive the signal light and the reference light transmitted from the communication terminal on the sending side via the communication channel and separate the received signal light and reference light from each other, a first phase modulator adapted to perform random phase modulation, on a pulse-by-pulse basis, on the reference light output from the light separator and passing via the first optical path or the signal light output from the light separator and passing via the second optical path, and a communication information acquisition unit adapted to acquire communication information on the basis of the reference light output from the light separator and passed via the first optical path and the signal light output from the light separator and passed via the second optical path. The communication terminal on the sending side includes a second light transmitting unit adapted to transmit the signal light and the reference light, received from the communication terminal on the receiving side via the communication channel, over the communication channel via a particular optical path, a frequency shifter adapted to shift frequencies of the signal light and the reference light passing via the particular optical path, a light attenuator adapted to attenuate the intensity level of the signal light passing via the particular optical path, and a second phase modulator adapted to perform phase modulation corresponding to the communication information, on a pulse-by-pulse basis, on the signal light passing via the particular optical path, wherein the frequency shifter and the light attenuator are formed by a single acousto-optic device.

As described above, this quantum cryptography communication apparatus includes the communication terminal on a receiving side, the communication terminal on a sending side, and the communication channel such as an optical fiber or a free space, and the two communication terminals are connected to each other via the communication channel. The light beam splitter splits the light pulse generated by the light source into signal light and reference light. The signal light pulse passes through the first light path and is transmitted over the communication channel. The reference light pulse passes through the second light path and is transmitted over the communication channel. As a result, the delay unit disposed in the first optical path or the second optical path creates a time difference between timings of transmitting the signal light pulse and the reference light pulse to the communication channel.

If the communication terminal on the sending side receives the reference light pulse and the signal light pulse via the communication channel, the communication terminal on the sending side returns the reference light pulse and the signal light pulse to the communication channel via the particular optical path. When the light pulses are returned, the signal light pulse passing through the particular optical path is attenuated by the light attenuator while the reference light pulse passing through the particular path is not subjected to the attenuation so that the signal light pulse returned over the communication channel has a low intensity while the reference light pulse returned over the communication channel has a relatively high intensity.

The frequencies of the signal light pulse and the reference light pulse passing through the particular light path are by the frequency shifter. This allows a great suppression of interference of the returned reference light and the signal light with backscattered light having a frequency equal to or lower than the frequency of the pulse light emitted from the light source on the receiving side. Note that the frequency shifter and the light attenuator are not formed separately but are formed by the single acousto-optic device so that the frequency shifter does not cause a reduction in the intensity of the reference light and thus does not cause an increase in excess noise in the measurement performed on the receiving side thereby preventing a reduction in reliability of quantum cryptography.

In this configuration in which the light attenuator and the frequency shifter are formed by the single acousto-optic device, it is not necessary to provide an additional control signal for controlling the frequency shift in addition to the control signal for controlling the light attenuation, and it is not necessary to provide excitation light for the frequency shift. Thus, the provision of the frequency shifter causes neither an increase in power consumption nor an increase in complexity of the configuration of the apparatus. Besides, in the configuration in which the light attenuator and the frequency shifter are realized by the single acousto-optic device, the frequency shifter does not cause an additional increase in fluctuation in the transmittance which can cause degradation of the performance quantum cryptography carried by low-intensity light.

In the communication terminal on the sending side, the second phase modulator performs phase modulation corresponding to the communication information, on a pulse-by-pulse basis, on the signal light passing via the particular optical path such that secret information is described in the form of phase in the light signal returned from the communication terminal on the sending side via the communication channel.

If the communication terminal on the receiving side receives the reference light and the signal light returned via the communication channel, the reference light and the signal light are separated from each other by the light separator. As described above, when the reference light and the signal light are transmitted from the communication terminal on the receiving side to the communication terminal on the sending side, the signal light is passed through the first light path and the reference light is passed through the second light path. However, for the light returned to the communication terminal on the receiving side from the communication terminal on the sending side, the reference light is passed through the first light path and the signal light is passed through the second light path. As a result, the signal light and the reference light arrives at the communication information acquisition unit at the same time.

The first phase modulator performs random phase modulation, on a pulse-by-pulse basis, on the reference light passing via the first optical path or the signal light passing via the second optical path. The communication information acquisition unit acquires communication information on the basis of the reference light passed through the first optical path and the light signal passed through the second optical path. More specifically, the communication information acquisition unit acquires the communication information by performing homodyne detection using a homodyne detector on the signal light and the reference light.

Because the frequencies of the signal light and the reference light have been shifted by the frequency shifter in the communication terminal on the sending side as described above, the frequencies of the signal light and the reference light input to the communication information acquisition unit are different from the frequency of backscattered light input to the communication information acquisition unit. Therefore, interference between the backscattered light and the reference light is prevented. That is, influence of the backscattered light is suppressed. In the configuration described above, a filter having a passband corresponding to the frequency band, shifted upward by the frequent, shifter, of the signal light and the reference light may be additionally disposed on a light incidence side of the homodyne detector.

The communication information acquisition unit acquires the communication information, for example, by performing a single-photon detection process using a single-photon detector on the signal light and the reference light. In this case, a filter having a passband corresponding to a frequency band, shifted upward by the frequency shifter, of the signal light and the reference light may be disposed on a light incidence side of the single-photon detector thereby to prevent the backscattered light from being incident on the single-photon detector and thus to suppress the influence of the backscattered light.

The width, T, of the light pulse generated by the light source and the frequency shift, fa, performed by the frequency shifter may be set, for example, such that T·fa is exactly or nearly equal to an integer so that a difference is produced between the frequency of the backscattered light and the frequency of the reference light and this frequency difference suppresses the influence of the backscattered light on the output of the heterodyne detection.

As described above, the present invention provides the great advantage. That is, in the quantum cryptography communication apparatus having the optical system via which light is transmitted and returned, the frequencies of the signal light and the reference light are shifted by the frequency shifter formed by the single acousto-optic device integrally with the light attenuator for attenuating the intensity level of the signal light so that the influence of the backscattered light is suppressed without producing degradation in performance or reliability of quantum cryptography.

Additional features and advantages are described herein, and will be apparent from the following Detailed Description and the figures.

BRIEF DESCRIPTION OF THE FIGURES

FIG. 10 is a diagram illustrating an example of a difference between sequences of detected bits mutually transmitted for confirmation, which occurs when communication data is eavesdropped;

FIGS. 12A to 12D show data that can be transmitted as effective information to be shared and also show matching and mismatching of bases, in a scheme in which four phase-modulated weak coherent states are used;

FIGS. 15A to 15C are diagrams for explanation of a coding efficiency in a quantum cryptography communication process in a mode using 4 phase modulation states on a sending side and two phase modulation bases on a receiving side;

FIG. 16 is a diagram for explanation of a bit identification process based on threshold values in a detection process on a data receiving side;

FIG. 18 is provided for explanation of a coding efficiency in a mode in which three phase modulation states are used on a sending side and three phase modulation bases are used on a receiving side;

FIG. 19 is a diagram for explanation of a phase modulation process performed on a sending side and a phase modulation process performed on a receiving side in a mode in which six phase modulation states are used on a sending side and three phase modulation bases are used on a receiving side, in a scheme in which arbitrary coherent states are used and measurement is performed using arbitrary modulation bases;

FIGS. 20A and 20B are provided for explanation of a coding efficiency in a mode in which six phase modulation states are used on a sending side and three phase modulation bases are used on a receiving side;

FIG. 21 is a diagram for explanation of a phase modulation process performed on a sending side and a phase modulation process performed on a receiving side in a mode in which eight phase modulation states are used on a sending side and two phase modulation bases are used on a receiving side, in a scheme in which arbitrary coherent states are used and measurement is performed using arbitrary modulation bases;

FIGS. 22A and 22B are provided for explanation of a coding efficiency in a mode in which eight phase modulation states are used on a sending side and two phase modulation bases are used on a receiving side;

FIGS. 24A and 24B are provided for explanation of a coding efficiency in a mode in which eight phase modulation states are used on a sending side and four phase modulation bases are used on a receiving side.

DETAILED DESCRIPTION

Embodiments Using Continuous-Variable Quantum Key Distribution Protocol

Figure 1:
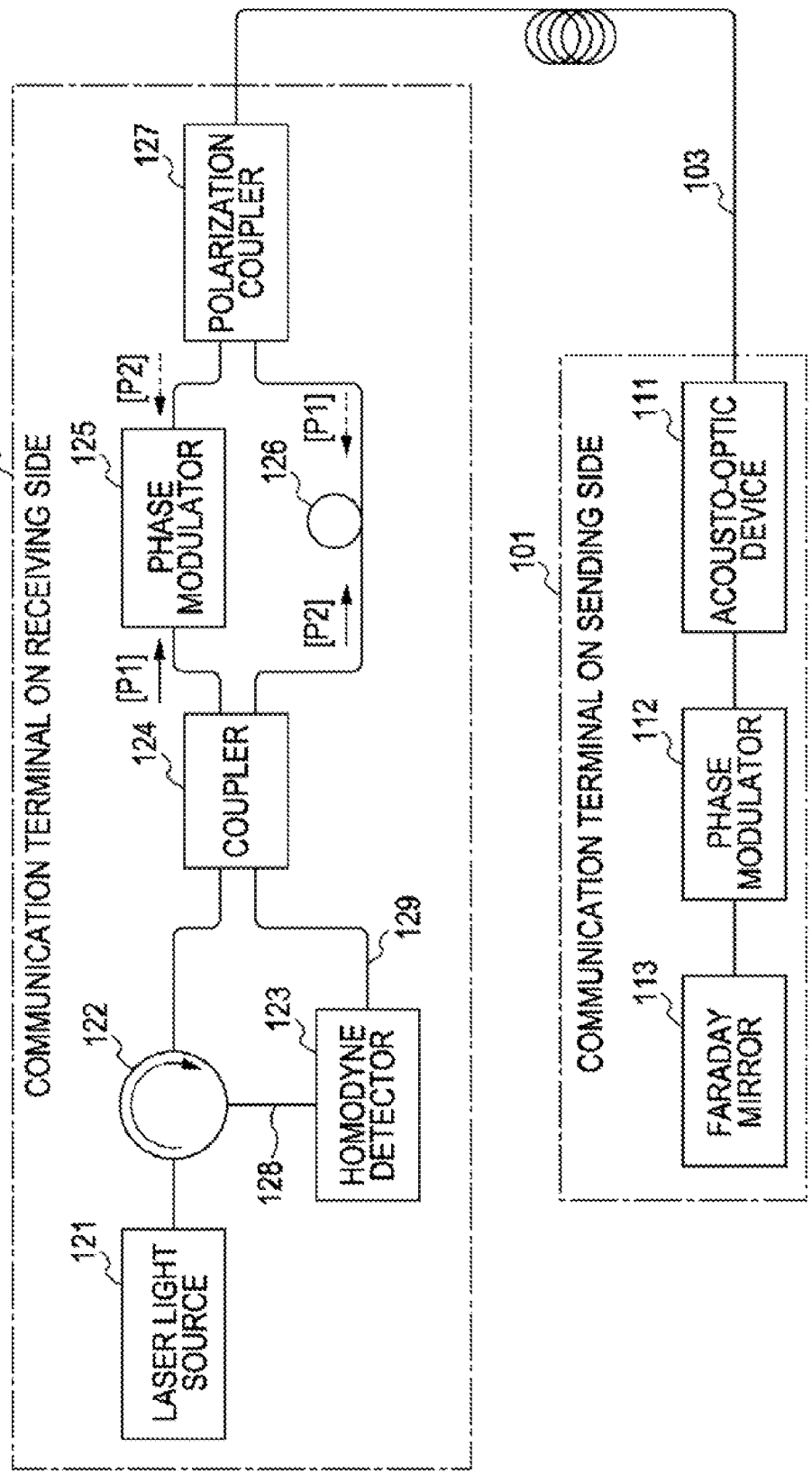
FIG. 1 is a block diagram illustrating an example of a configuration of a quantum cryptography communication apparatus (using a continuous variable quantum key distribution protocol) according to an embodiment.

FIG. 1 illustrates an example of a configuration of a quantum cryptography communication apparatus 100 according to a first embodiment. This quantum cryptography communication apparatus 100 is adapted to operate using a continuous-variable quantum key distribution protocol. The quantum cryptography communication apparatus 100 includes a communication terminal 101 on a sending side a communication terminal 102 on a receiving side and a communication channel 103 such as an optical fiber connecting the two communication terminals 101 and 102.

The communication terminal 102 receiving side includes a laser light source 121, a circulator 122, a homodyne detector 123, a 1:1 coupler 124, a phase modulator 125, an optical fiber delay line 126, and a polarization coupler 127. The coupler 124 functions as a light beam splitter. The phase modulator 125 functions as a first phase modulator. The optical fiber delay line 126 functions as a delay unit. The polarization coupler 127 functions as a first light beam splitting/transmitting unit. The homodyne detector 123 functions as a communication information acquisition unit. An optical path from the coupler 124 to the polarization coupler 127 via the phase modulator 125 forms a first optical path, is referred to as an optical path, and an optical path from the coupler 124 to the polarization coupler 127 via optical fiber delay line 126 is referred to as a second optical path.

The communication terminal 102 on the sending side includes an acousto-optic device 111, a phase modulator 112 and a Faraday mirror 113. The acousto-optic device 111 functions as a light attenuator, a frequency shifter, and a second light transmitting unit. The phase modulator 112 functions as a second phase modulator.

By using the quantum cryptography communication apparatus 100 configured in the above-described manner, QKD (quantum key distribution protocol) can be performed using one of three schemes: a first scheme in which four phase-modulated weak coherent states are used; a second scheme in which arbitrary coherent states are used and measurement is performed in arbitrary modulation bases; and a third scheme in which Gaussian-modulated coherent states are used. A further detailed description of the first scheme may be found, for example, in Japanese Unexamined Patent Application Publication No. 2005-286485. A further detailed description of the second scheme may be found for example, in Japanese Unexamined Patent Application Publication No. 2006-109265. A further detailed description of the third scheme may be found, for example, in "F. Grosshans, G. V. Assche, J. Wenger, R. Tualle-Brouri, N. J. Cerf, and P. Grangier, Nature, 423, 238 (2003)."

A communication process using quantum cryptography performed by the respective parts of the quantum cryptography communication apparatus 100 is explained below. In the communication process, as described below, a light pulse is generated by the laser light source 121 in the communication terminal 102 on the receiving side and transmitted to the communication terminal 101 on the sending side via the communication channel 103, and the light pulse is returned to the communication terminal 102 on the receiving side via the communication channel 103.

The pulse light emitted from the laser light source 121 of the communication terminal 102 on the receiving side passes through the circulator 122 and is incident on the 1:1 coupler 124. The circulator 122 controls the optical path such that light from the laser light source 121 is output to the coupler 124, and light returned from the coupler 124 is output to the homodyne detector 123.

The pulse light emitted from the laser light source 121 is split by the coupler 124 into pulse light P1 and pulse light P2. The pulse light P1 output from the coupler 124 is incident on the polarization coupler 127 via the phase modulator 125. Note that the phase modulator 125 is not operated at this point of time. On the other hand, the pulse light P2 output from the coupler 124 is incident on the polarization coupler 127 via the delay optical fiber 126.

In the following explanation of the present embodiment, it is assumed by way of example that the pulse light P1 is signal light, and the pulse light P2 is reference light, although the pulse light P1 can be reference light, and the pulse light P2 can be signal light. Instead of employing the above-described configuration, the quantum cryptography communication apparatus 100 may be configured such that the delay optical fiber 126 is disposed in the same optical path as that in Which the phase modulator 125 is disposed.

The pulse light P1 (hereinafter referred to as "signal light P1") and the pulse light P2 (hereinafter referred to as "reference light P2" as) are polarized such that such that as of when they are incident on the polarization coupler 127, if one of them is in a horizontally polarized state, the other one should be in a vertically polarized state. For example, the signal light P1 is horizontally polarized, while the reference light P2 is vertically polarized. The signal light P1 and the reference light P2 are input to the communication channel 103 via the polarization coupler 127. Note that because the reference light P2 is passed through the delay optical fiber 126, the signal light P1 is input to the communication channel 103 earlier than the reference light P2. In FIG. 1, the signal light P1 and the reference light P2 traveling in a direction from the communication terminal 102 on the receiving side to the communication terminal 101 on the sending side are denoted by solid-line arrows, while the signal light P1 and the reference light P2 traveling back in a direction from the communication terminal 101 on the sending side to the communication terminal 102 on the receiving side are denoted by dotted-line arrows.

The signal light P1 and the reference light P2 transmitted from the communication terminal 102 on the receiving side are incident on the communication terminal 101 on the sending side via the communication channel 103. In the communication terminal 101 on the sending side, the signal light P1 and the reference light P2 incident from the communication channel 103 travel through the acousto-optic device 111 and the phase modulator 112 and arrive at the Faraday mirror 113. The signal light P1 and the reference light P2 are rotated in polarization by the Faraday mirror 113 and are reflected back therefrom. The reflected signal light P1 and the reference light P2 again passes through the phase modulator 112, and the acousto-optic device 111, and are output from the acousto-optic device 111 to the communication channel 103.

In the communication terminal 101 on the sending side, the signal light P1 is attenuated by the acousto-optic device 111 and is phase-modulated by the phase modulator 112 in accordance with communication information. In the first and second schemes described above, the signal light P1 is attenuated by acousto-optic device 111 such that the signal light P1 has, on average, for example, one photon when the signal light P1 is output from the acousto-optic device 111. Furthermore, in the first scheme described above, the signal light P1 is phase-modulated on a pulse-by-pulse basis by the phase modulator 112 by an angle randomly selected from $\phi A \in \{0, \pi/2, \pi, 3\pi/2\}$. In the second scheme described above, various protocols are possible. For example, in a protocol in which three states are used and measurement is performed using three modulation bases, the signal light P1 is phase-modulated on a pulse-by-pulse basis by the phase modulator 112 by an angle selected from $\phi A \in \{0, 2\pi/3, 4\pi/3\}$.

In the third scheme described above, values of quadrature phase amplitude coordinates (x, p) axes are selected on a pulse-by-pulse basis according to a Gaussian distribution (with an average of 0 and a properly selected variance). The intensity of the signal light P1 is attenuated by the acousto-optic device 111 such that the signal light P1 output from the acousto-optic device 111 has an average number of photons equal to $x^2+p^2$. Furthermore, the signal light P1, is phase-modulated on a pulse-by-pulse basis by the phase modulator 112 by an angle given by $\tan^{-1}(p/x)$.

In the communication terminal 101 on the sending side, the frequencies of the signal light P1 and the reference light P2 are shifted by the acousto-optic device 111. As described above, the acousto-optic device 111 functions as the light attenuator and the frequency shifter.

Figure 2:
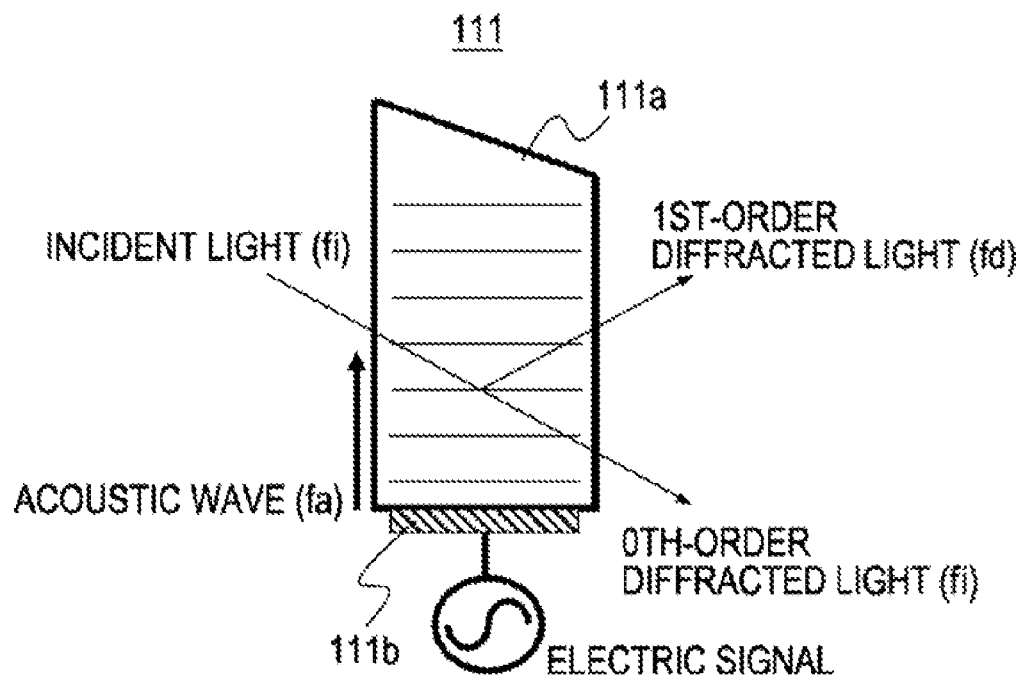
FIG. 2 is a diagram illustrating a specific example of a structure of an acousto-optic device functioning as a frequency shifter and a light attenuator.

FIG. 2 illustrates an example of a specific structure of the acousto-optic device 111. As shown in FIG. 2, the acousto-optic device 111 includes acousto-optic crystal 111a and an excitation electrode 111b bonded to the acousto-optic crystal 111a. As shown in FIG. 2, if an electric signal (a frequency signal) is applied to the excitation electrode 111b, an acoustic wave is generated in the acousto-optic crystal 111a and a sequence of compression and expansion of reflective index occurs in the acousto-optic crystal 111a, which causes the light incident on the acousto-optic crystal 111a to be split into 0-th order diffracted light and 1st-order diffracted light.

In the acousto-optic device 111 with the structure shown in FIG. 2, the intensity level of first-order diffracted light changes in accordance with a change in the amplitude of the voltage signal applied to the excitation electrode 111b. This property allows the acousto-optic device 111 to function as a light attenuator.

Figure 3:
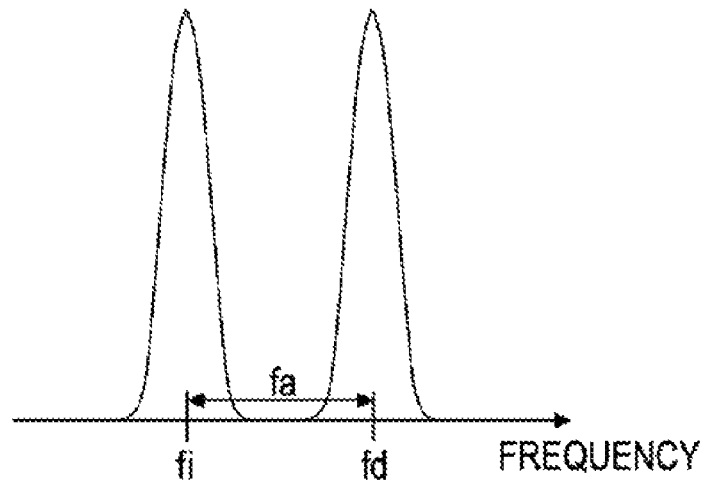
FIG. 3 is a diagram illustrating a manner in which a frequency is shifted by an acousto-optic device.

Furthermore, in the acousto-optic device 111 with the structure shown in FIG. 2, an interaction between light and an acoustic wave causes the frequency of the first-order diffracted light to shift such that an equation $fd=fi+fa$ is satisfied where fd is the frequency of the first-order diffracted light, fi is the frequency of incident light, and the fa is the frequency of the acoustic wave. Note that the light is incident in a direction against the acoustic wave. From the view point of the quantum mechanics, the above process can be expressed such that one photon of the incident light and one phonon disappear, and one photon behaving as diffracted light is generated. In this process, the frequency of light shifts to a higher value so that total energy is conserved. Thus, as shown in FIG. 3, when light passes through the acousto-optic device 111, the spectral distribution of pulsed light shifts from fi to fd in center frequency of the distribution. Thus, the acousto-optic device 111 functions as the frequency shifter.

The signal light P1 and the reference light P2 returned back from the communication terminal 101 on the sending side via the communication channel 103 are incident on the polarization coupler 127 of the communication terminal 102 on the receiving side. The polarization direction is rotated by Faraday mirror 113 of the communication terminal 101 on the sending side, and the polarization fluctuation occurring along the communication channel 103 is cancelled out when light travels in the forward direction and then in the opposite direction. Thus, as observed immediately before the polarization coupler 127, the signal light P1 is vertically polarized while the reference light P2 is horizontally polarized.

Therefore, in the communication terminal 102 on the receiving side, the signal light P1 returned back and incident on the polarization coupler 127 is output from the polarization coupler 127 to the delay optical fiber 126, and the signal light P1 is incident on the coupler 124 via the delay optical fiber 126. On the other hand, the reference light P2 returned back to the communication terminal 102 on the receiving side is incident on the coupler 124 via the polarization coupler 127 and the phase modulator 125.

In the first and third schemes described above, the reference light P2 is phase-modulated by the phase modulator 125 on a pulse-by-pulse basis by an angle randomly selected from $\phi B \in \{0, \pi/2\}$. In the second scheme, when three states are used and measurement is performed using three modulation bases, the reference light P2 is phase-modulated by the phase modulator 125 on a pulse-by-pulse basis by an angle randomly selected from $\phi B \in \{\pi/2, -\pi/6, -5\pi/6\}$.

The two passes of the signal light P1 and the reference light P2 between the coupler 124 and the polarization coupler 127 are exchanged between in the case where the signal light P1 and the reference light P2 travel from the communication terminal 102 on the receiving side to the communication terminal 101 on the sending side and in the case where the signal light P1 and the reference light P2 return from the communication terminal 101 on the sending side to the communication terminal 102 on the receiving side. As a result, the signal light P1 and the reference light P2 arrive at the coupler 124 at the same time.

The signal light P1 and the reference light P2 interfere with each other in the coupler 124, and the signal light P1 and the reference light P2 are output from the two terminals of the coupler 124 to the homodyne detector 123. When the signal light P1 and the reference light P2 travels to the homodyne detector 123, one of the signal light P1 and the reference light P2 passes through the circulator 122 and the optical fiber 128, while the other one passes through the optical fiber 129. In the homodyne detector 123, the two light pulses output from the coupler 124 are respectively incident on corresponding photodiodes, and the difference between signals output from the two photodiodes is determined. Thus, homodyne detection is performed and communication information is obtained as a result of the homodyne detection.

Figure 4:
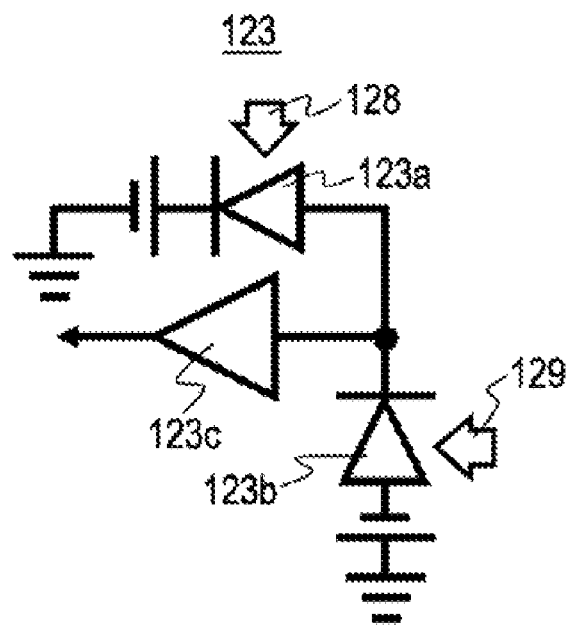
FIG. 4 is a diagram illustrating an example of a configuration of a homodyne detector having no filter.

FIG. 4 shows an example of a configuration of the homodyne detector 123. In the example shown in FIG. 4, the homodyne detector 123 includes two photodiode 123a and 123b and an amplifier 123c. An end of the optical fiber 128 is connected to the photodiode 123a, and an end of the optical fiber 129 is connected to the photodiode 123b. The anode of the photodiode 123a and the cathode of the photodiode 123b are both connected to the input node of the amplifier 123c. The output node of the amplifier 123c is connected to a data storage device that is not shown in the figure.

In the quantum cryptography communication apparatus 100 shown in FIG. 1, the frequencies of the signal light P1 and the reference light P2 are shifted upward by the acousto-optic device 111 in the communication terminal 101 on the sending side, and the resultant signal light P1 and the reference light P2 are returned back to the to the communication terminal 102 on the receiving side. Therefore, the frequency of the signal light P1 and that of the reference light P2 are different from the frequency of backscattered light having a frequency equal to or lower than the frequency of the original signal light P1 and reference light P2. This frequency difference allows the interference between the reference light P2 and the backscattered light to be suppressed, and thus noise due to the interference between the reference light P2 and the backscattered light in the homodyne detection based on interference between the signal light P1 and reference light P2 performed by the homodyne detector 15 in the communication terminal 2 on the receiving side is minimized.

Backscattering of light occurring in optical fibers is explained in further detail below. When light is incident on an optical fiber, Backscattering of the light can occur in various ways (see, for example, "Nonlinear Fiber Optics", G. P. Agrawal (Academic Press, 1995)). One of many types of backscattering is Rayleigh scattering caused by fluctuations in reflective index due to random variations in density of fused quartz glass created in a production process of an optical fiber. It is known that Rayleigh scattering can be a great problem to quantum key distribution systems (see, for example, D. Subacius, A. Zavriyev, and A. Trifonov, Appl. Phys. Lett., 86, 011103 (2005)).

Rayleigh scattered light has the same frequency as the frequency of incident light. Scattering due to nonlinear effects in an optical fiber includes stimulated Raman scattering and stimulated Brillouin scattering. From the view point of the quantum mechanics, the process of this type of scattering can be described such that one photon in an incident field disappears, and one photon with a lower Stokes frequency and a phonon are generated at the same time. The generated photon behaves as scattered light. The difference between stimulated Raman scattering and stimulated Brillouin scattering is that optical phonons have a contribution to the former process, while acoustic phonons have a contribution to the latter process.

In the continuous variable QKD, backscattered light can interfere with the reference light, which functions as noise in detection of the signal information by interference between the signal light and the reference light. Because the reference light has a large number of photons compared with the signal light, interference between the reference light and backscattered light can have a significant influence even if the intensity of the backscattered light is low. In the single-photon QKD, the APD can react to backscattered light having even a low intensity, and thus the backscattered light functions as noise in the detection of the signal light.

In the quantum cryptography communication apparatus 100 shown in FIG. 1, the acousto-optic device 111 in the communication terminal 101 on the sending side functions not only as the light attenuator but also as the frequency shifter. Thus, the frequency shifter for shifting the frequencies of the signal light P1 and the reference light P2 can be realized without increasing the number of optical elements disposed in the optical path. Therefore, no reduction in intensity of the reference light P2 occurs and no excess noise occurs in measurement performed in the communication terminal 102 on the receiving side. Thus no degradation in security of the quantum cryptography occurs.

In the quantum cryptography communication apparatus 100 shown in FIG. 1, the acousto-optic device 111 in the communication terminal 101 oil the sending side functions not only as the light attenuator but also as the frequency shifter. Therefore, it is not necessary to provide an additional control signal for controlling the frequency shift in addition to the control signal for controlling the light attenuation, and it is not necessary to provide excitation light for the frequency shift. Thus, the provision of the frequency shifter causes neither an increase in power consumption nor an increase in complexity of the configuration of the apparatus.

In the quantum cryptography communication apparatus 100 shown in FIG. 1, the acousto-optic device 111 in the communication terminal 101 on the sending side functions not only the light attenuator but also as the frequency shifter. Thus, the frequency shifter for shifting the frequencies of the signal light P1 and the reference light P2 can be realized without increasing the number of optical elements disposed in the optical path and thus without causing an additional increase in fluctuation in the transmittance which can cause degradation of the performance quantum cryptography carried by low-intensity) light.

Figure 5:
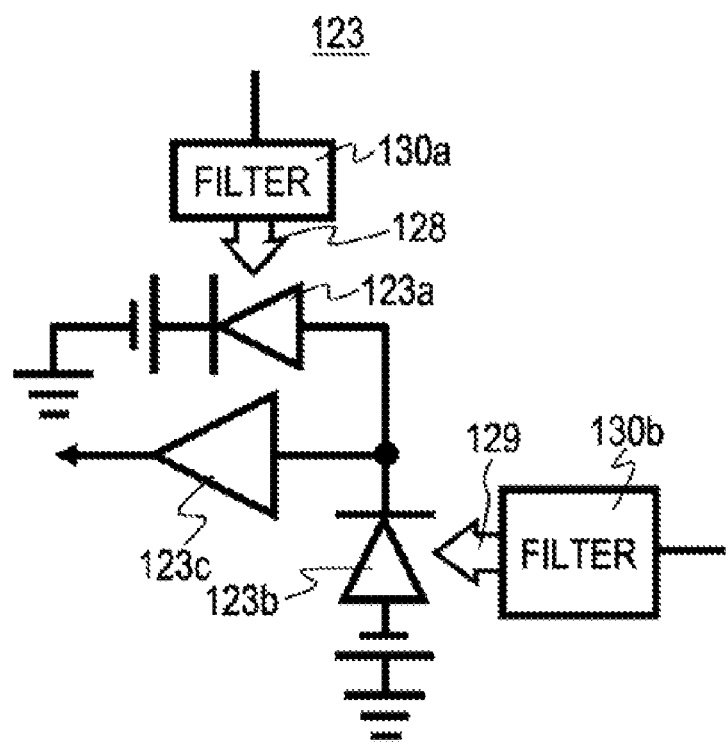
FIG. 5 is a diagram illustrating an example of a configuration of a homodyne detector having a filter.

The homodyne detector 123 in the configuration shown in FIG. 4 may be modified such that filters 130a and 130b are disposed directly in front of the respective photodiodes 123a and 123b. In this configuration, characteristics of the filters 130a and 130b are set such that the filters 130a and 130b have a low transmittance for pulse light generated from the laser light source 121, backscattered light, and light generates as a result of interference between backscattered light and the reference light P2, while the filters 130a and 130b have a high transmittance for the signal light P1 and the reference light P2 shifted in frequency by the acousto-optic device 111. That is, the filters 130a and 130b have a passband corresponding to the frequency bands of the signal light P1 and the reference light P2. Use of the homodyne detector 123 with the configuration shown in this FIG. 5 prevents undesirable noise components from being incident on the homodyne detector 123 and thus makes it possible for the homodyne detector 123 to detect only interference which should be detected.

Because the reference light P2 1 and the backscattered light are different in frequency as described above, a heterodyne detection occurs between these two different frequencies. Interference caused by such a heterodyne detection can be suppressed by properly setting the magnitude of the frequency shift and the pulse width as described bellow.

The magnitude of the interference signal output as a result of the heterodyne detection is proportional to $\sin(2\pi(fd-fi)t-\phi)$ where t denotes time, and $\phi$ denotes the phase difference between the backscattered light and the reference light P2, caused by detection of backscattered light at various times. The average of the magnitude of the interference signal with respect to the phase difference $\phi$ of the backscattered light can be calculated by integrating $\sin(2\pi(fd-fi)t-\phi)$ with respect to t over the period equal to the pulse with T of the light pulse generated by the laser light source 121 and further calculating the average with respect to $\phi$, according to equation (1) shown below.

$$\int_0^{2\pi} \left| \int_{-\frac{T}{2}}^{\frac{T}{2}} \frac{1}{2\pi} \sin(2\pi f_a t - \phi) dt \right| d\phi = \frac{2}{\pi^2 f_a} |\sin(\pi f_a T)| \tag{1}$$

In the quantum cryptography communication apparatus 100 shown in FIG. 1, the width T of the pulse light generated by the laser light source 121 and the magnitude fa of the frequency shift created by the acousto-optic device 111 are set such that fa·T is precisely or nearly equal to an integer thereby minimizing the interference expressed by equation (1).

Figure 6:
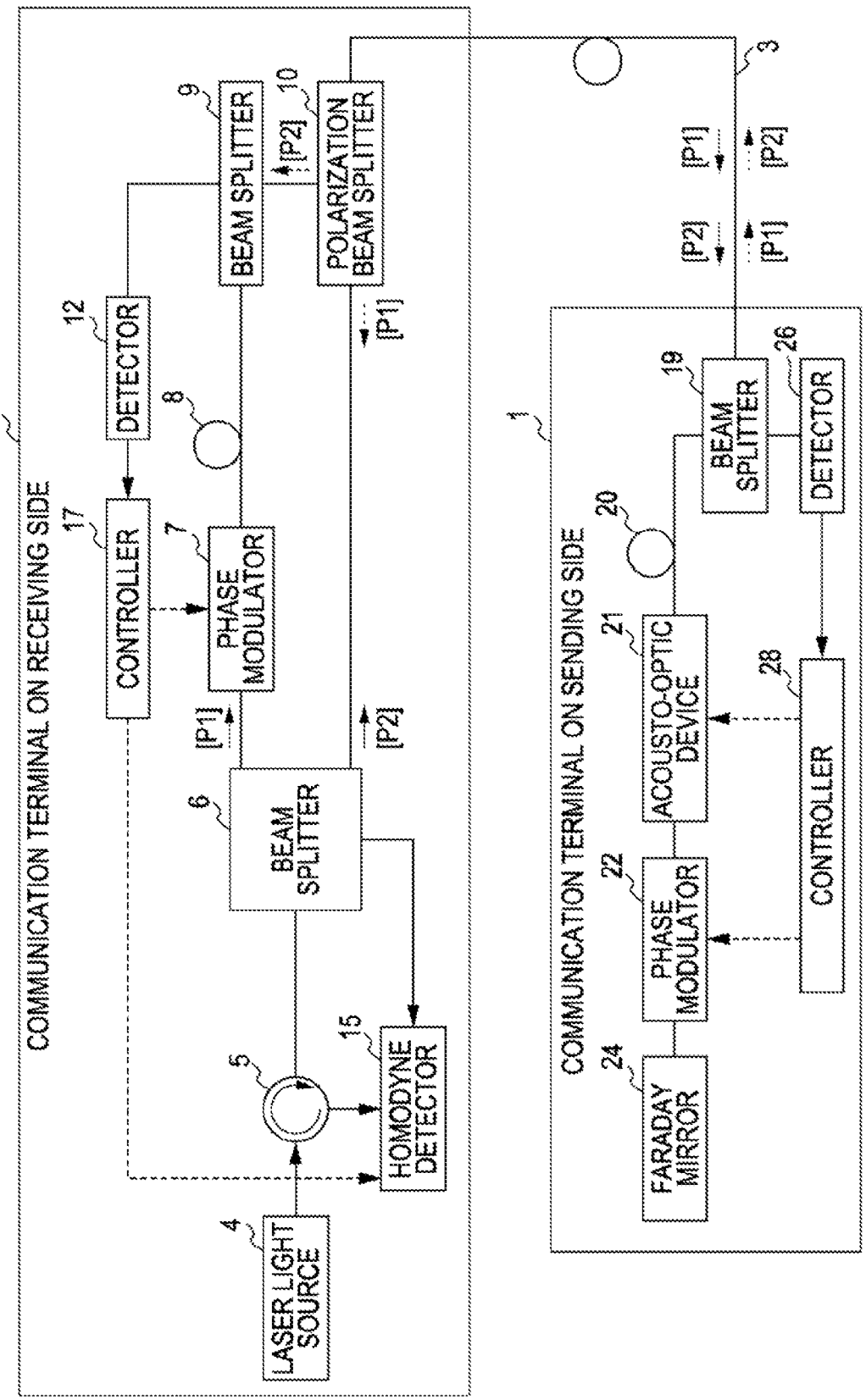
FIG. 6 is a block diagram illustrating a specific example of a configuration of a quantum cryptography communication apparatus using a scheme in which four phase-modulated weak coherent states are used.

Specific example of quantum cryptography communication apparatus using the first scheme An explanation is given below as to a specific example of a configuration of the quantum cryptography communication apparatus using the first scheme in which four phase-modulated weak, coherent states are used. FIG. 6 illustrates an example of a configuration of the quantum cryptography communication apparatus 100A using the first scheme.

In the example shown in FIG. 6, the quantum cryptography communication apparatus 100A includes a communication terminal 1 on the sending side, a communication terminal 2 on the receiving side, and a communication channel 3 such as an optical fiber connecting the communication terminal 1 on the sending side and the communication terminal 2 on the receiving side. In the quantum cryptography communication apparatus 100A, secret information (communication information) is sent from the communication terminal 1 on the sending side to the communication terminal 2 on the receiving side via the communication channel 3. An example of secret information transmitted is a common secret key used in symmetric key cryptography.

The communication terminal 2 on the receiving side includes a laser light source 4, a circulator 5, a 1:1 beam splitter 6, a phase modulator 7, a delay unit 8, a beam splitter 9, a polarization beam splitter 10, a detector 12, a homodyne detector 15 and a controller 17. The communication terminal 1 on the sending side includes a beam splitter 19, a delay unit 20, an acousto-optic device 21, a phase modulator 22, a Faraday mirror 24, a detector 26 and a controller 28. As for the communication channel 3, an optical fiber or free space may be employed. In the case where free space is used as the communication channel 3, the effects of diffraction of light can be suppressed by increasing the light beam diameter traveling through the communication channel 3 by using a telescope.

A communication process using quantum cryptography performed by the respective parts of the quantum cryptography communication apparatus 100A is explained below. In the communication process, as described below, a light pulse is generated by the laser light source 4 in the communication terminal 2 on the receiving side and transmitted to the communication terminal 1 on the sending side via the communication channel 3, and the light pulse is returned to the communication terminal 2 on the receiving side via the communication channel 3.

The circulator 5 in the communication terminal 2 on the receiving side controls the optical path such that light from the laser light source 4 is output to the beam splitter 6, and light returned from the beam splitter 6 is output to the homodyne detector 15. If the light pulse generated by the laser light source 4 of the communication terminal 2 on the receiving side is input to the beam splitter 6 via the circulator 5, the beam splitter 6 splits the input light into a light pulse P1 serving as a signal light pulse and a light pulse P2 serving as a reference light pulse.

The light pulse P1 output from the beam splitter 6 travels through the phase modulator 7, the delay unit 8, and the beam splitter 9, and arrives at the polarization beam splitter 10. The light pulse P2 output from the beam splitter 6 directly travels to the polarization beam splitter 10. In FIG. 6, the signal light P1 and the reference light P2 traveling in a direction from the communication terminal 2 on the receiving side to the communication terminal 1 on the sending side are denoted by solid-line arrows, and the signal light P1 and the reference light P2 traveling back in a direction from the communication terminal 1 on the sending side to the communication terminal 2 on the receiving side are denoted by dotted-line arrows.

Parts disposed in the two optical paths from the beam splitter 6 to the polarization beam splitter 10 are connected via polarization-preserving optical fibers from one part to an adjacent part so that the light pulse P1 (hereinafter referred to as the signal light P1) and the light pulse P2 (hereinafter referred to as the reference light P2) are combined together at the polarization beam splitter 10 and output as the signal light P1 and the reference light P2 linearly polarized in direction perpendicular to each other from the polarization beam splitter 10 over the communication channel 3.

Note that the delay unit 8 delays the signal light P1 so that the signal light P1 is input to the communication channel 3 at a later time than the reference light P2. The time difference between the signal light P1 and the reference light P2 is set to be much greater than the coherence time of the light pulse generated by the laser light source 4 and much greater than the response time of the phase modulator 7 of the communication terminal 2 on the receiving side, and the response times of the phase modulator 22 and the acousto-optic device 21 in the communication terminal 1 on the sending side.

If the communication terminal 1 on the sending side receives the signal light P1 and the reference light P2 from the communication terminal 2 on the receiving side via the communication channel 3, the receiving signal light P1 and reference light P2 are input to the beam splitter 19. The beam splitter 19 splits the input light such that light is most output to the delay unit 20 and the remaining part of the light is output to the detector 26. That is, the split ratio of the beam splitter 19 is set such that as much light as possible is sent to the delay unit 20 as long as the detector 26 can detect the light pulse P2. More specifically, for example, the ratio of the intensity of the light sent to the delay unit 20 to the intensity of light sent to the detector 26 is set to 9:1.

The detector 26 is used to detect the arrival of the reference light P2. The detector 26 may be realized bay a combination of a photodiode or an avalanche photodiode and an amplifier. The photodiode or the avalanche photodiode may be of a silicon-based device when the wavelength of the pulse light is in a visible range or a near-infrared range, and may be of a Ge or InGaAs-based device when the wavelength of the pulse light is in the range from 1.3 μm to 1.6 μm. The detector 12 in the communication terminal 1 on the sending side may be realized in a similar manner to the detector 26, although a further detailed explanation thereof is omitted herein.

A detection signal output from the detector 26 is supplied to the controller 28. Although in the example shown in FIG. 6, the acousto-optic device 21 is disposed between the phase modulator 22 and the communication channel 3, the phase modulator 22 may be disposed between the acousto-optic device 21 and the communication channel 3.

The controller 28 controls the acousto-optic device 21 and the phase modulator 22. The acousto-optic device 21 functions as the light attenuator and the frequency shifter. The acousto-optic device 21 is controlled so as to have a low attenuation ratio for the reference light P2, and the phase modulator 22 is not operated for the reference light P2. On the other hand, for the signal light P1, the acousto-optic device 21 has a high attenuation ratio, and the signal light P1 is phase-modulated by the phase modulator 22.

When the signal light P1 and the reference light P2 are passed through the acousto-optic device 21 in the communication terminal 1 on the sending side, the frequencies of the signal light P1 and the reference light P2 are shifted. More specifically, the acousto-optic device 21 is configured as shown in FIG. 2 so that the frequencies of the signal light P1 and the reference light P2 are upwardly shifted when they are passed through the acousto-optic device 21.

The controller 28 detects the arrival of the reference light P2 on the basis of the detection signal output from the detector 26 and controls the phase modulator 22 so as to properly perform the phase modulation on the signal light P1 and also controls the acousto-optic device 21 so as to have a proper attenuation ratio. Thus, the phase modulator 22 can perform the phase modulation on each signal light pulse P1 at a right time and can switch the attenuation ratio at a right time depending on whether light is the signal light P1 or the reference light P2.

For example, in the case where four quantum states are used in the quantum cryptography, phase modulator 22 performs phase modulation on each pulse by an amount randomly selected from 0° (0 rad), 90° ($\pi/2$ rad), 180° ($\pi$ rad), and 270°($3\pi/2$ rad). The phase modulator 22 may be, for example, a LiNbO3 phase modulator.

The signal light P1 and the reference light P2 input from the communication terminal 1 on the sending side from the communication terminal 2 on the receiving side via the communication channel 3 are reflected by the Faraday mirror 24 in the communication terminal 1 on the sending side and returned back to the communication terminal 2 on the receiving side. Thus, the signal light P1 and the reference light P2 pass twice through the phase modulator 22 and acousto-optic device 21 in the communication terminal 1 on the sending side, once when they travel toward the Faraday mirror 24, and once when they travel back from the Faraday mirror 24. For the signal light P1, the attenuation ratio of the acousto-optic device 21 is set such that each signal light pulse P1 returned from the communication terminal 1 on the sending side to the communication terminal 2 on the receiving side has, on average, one photon.

On the other hand, the average number of photons included in each reference light pulse P2 returned from the communication terminal 1 on the sending side to the communication terminal 2 on the receiving side is selected such that the homodyne detector 15 in the communication terminal 2 on the receiving side has an optimum signal-to-noise ratio. Typically, the reference light P2 has an intensity corresponding to an average number of photons of 106. In such a case, the ratio of the transmittance of the acousto-optic device 21 in the communication terminal 1 on the sending side for the signal light P1 to that for the reference light P2 is set to 10-6:1.

In the homodyne detection, the state of the signal light is measured by superimposing the reference light having a high intensity (typically including an average number of photons of 106 per pulse) on the signal light having a low intensity (including an average number of photons of 1). That is, the intensity of the signal light P1 returned from the communication terminal 1 on the sending side to the communication terminal 2 on the receiving side is controlled such that it functions as signal light including an average number of photons of 1, and the intensity of the reference light P2 returned from the communication terminal 1 on the sending side to the communication terminal 2 on the receiving side is controlled such that it functions as reference light including an average number of photons of 106.

In the communication terminal 1 on the sending side, the phase modulator 22 and the acousto-optic device 21 need to provide phase modulation and attenuation independently of the polarization of pulse light input to the communication terminal 1 on the sending side from the communication channel 3. This requirement is automatically satisfied if the signal light P1 and the reference light P2 are reflected by the Faraday mirror 24. The acousto-optic device 21 has a transmittance having substantially no dependence on the polarization of light, and thus the transmittance of the acousto-optic device 21 is set to 10-3 for the signal light P1.

After the above-described process is performed in the communication terminal 1 on the sending side, the resultant attenuated pulse light and the non-attenuated pulse light, that is, the attenuated signal light P1 and the non-attenuated reference light P2 are input to the communication terminal 2 on the receiving side via the communication channel 3. The signal light P1 and the reference light P2 input to the communication terminal 2 on the receiving side are separated from each other by the polarization beam splitter 10. In the separation process, the signal light P1 is output over a short optical path directly leading to the beam splitter 6, while the reference light P2 is output over a long optical path passing though the beam splitter 9, the delay unit 8, and the phase modulator 7. In FIG. 6, the signal light P1 and the reference light P2 are represented by dotted arrows.

Because the signal light P1 and the reference light P2 were reflected by the Faraday mirror 24 disposed in the communication terminal 1 on the sending side, the signal light P1 and the reference light P2 coming back to the polarization beam splitter 10 in the communication terminal 2 on the receiving side have polarization planes rotated by 90° from those of the signal light P1 and the reference light P2 output from the communication terminal 2 on the receiving side. Because of such rotation in the polarization plane, the signal light P1 input to the communication terminal 2 on the receiving side is output by the polarization beam splitter 10 to the short optical path directly leading to the beam splitter 6, and the reference light P2 is output to the long optical path passing though the beam splitter 9, the delay unit 8, and the phase modulator 7.

Thus, the two passes of the signal light P1 and the reference light P2 between the polarization beam splitter 10 and the beam splitter 6 in the communication terminal 2 on the receiving side are exchanged between in the case where the signal light P1 and the reference light P2 travel in a direction from the communication terminal 2 on the receiving side to the communication terminal 1 on the sending side and in the case where the signal light P1 and the reference light P2 travel back in an opposite direction from the communication terminal 1 on the sending side to the communication terminal 2 on the receiving side. In this configuration, the weak signal light P1 attenuated via the attenuation process performed in the communication terminal 1 on the sending side passes through the short optical path including no optical elements in the communication terminal 2 on the receiving side and thus the propagation loss of the signal light P1 in the communication terminal 2 on the receiving side is minimized.

The reference light P2 separated from the signal light P1 by the polarization beam splitter 10 has an average number of photons of 106 per pulse and is split by the beam splitter 9 into pulse light directed to the delay unit 8 and pulse light directed to the detector 12. The split ratio of the beam splitter 9 is typically set to 9:1 so that the pulse light is most supplied to the delay unit 8.

The detector 12 in the communication terminal 2 on the receiving side is configured in a similar manner to the detector 26 in the communication terminal 1 on the sending side, and the split ratio of the beam splitter 9 is set such that as much light as possible is sent to the delay unit 8 as long as the detector 12 can detect the arrival of the pulse light P2. The signal output from the detector 12 is supplied to the controller 17. In addition to controlling the phase modulator 7, the controller 17 also controls the timing of reading the signal output from the homodyne detector 15.

The controller 17 detects the arrival of the reference light P2 on the basis of the detection signal output from the detector 12 and controls the phase modulator 7 so as to properly perform the phase modulation on the reference light P2 so that the phase modulator 7 performs the phase modulation on each reference light pulse P2 at a right time.

The phase modulator 7 performs the phase modulation on the reference light P2 supplied from the delay unit 8 on a pulse-by-pulse basis by a randomly selected amount. In the case of quantum cryptography using four quantum states, the amount of phase modulation is randomly selected from 0° (0 rad) and 90° ($\pi/2$ rad).

When the signal light P1 travels in the forward direction from the communication terminal 2 on the receiving side to the communication terminal 1 on the sending side, the signal light P1 travels along the long optical path (the beam splitter 6→the phase modulator 7→the delay unit 8→the beam splitter 9→the polarization beam splitter 10). In the back travel, the signal light P1 travels along the short optical path (the polarization beam splitter 10→the beam splitter 6). On the other hand, in the forward direction, the reference light P2 travels along the short optical path (the beam splitter 6→the polarization beam splitter 10), while in the back travel, the reference light P2 travels along the long optical path (the polarization beam splitter 10→the beam splitter 9→the delay unit 8→the phase modulator 7→the beam splitter 6). Thus, both the signal light P1 and the reference light P2 travel the same total optical path length between the communication terminal 2 on the receiving side and the communication terminal 1 on the sending side, and thus the signal light P1 and the reference light P2 arrive at the beam splitter 6 at the same time.

The signal light P1 is light exhibiting properties of the quantum mechanics. The reference light (also called local oscillation light) P2 having high intensity compared with the intensity of the signal light P1 is superimposed on the signal light P1 thereby to perform heterodyne detection. One of the two outputs from the beam splitter 6 is input directly to the homodyne detector 15 and the other is input thereto via the circulator 5.

The homodyne detector 15 has two photodiodes disposed on the input side thereof (FIG. 4). The photodiodes may be of a silicon-based device when the wavelength of the pulse light is in a visible range or a near-infrared range, and may be of a Ge or InGaAs-based device when the wavelength of the pulse light is in the range from 1.3 μm to 1.6 μm. Signals output from the two photodiodes are input to a low-noise high-gain amplifier, and a signal output from the amplifier is normalized by the intensity of the reference light P2 or the gain of the amplifier thereby to obtain the quadrature phase amplitude of the signal light P1. Thus, secret communication information such as secret key information is obtained from the detection information output from the homodyne detector 15.

In the quantum cryptography communication apparatus 100A described above with reference to FIG. 6, the frequencies of the signal light P1 and the reference light P2 are shifted upward by the acousto-optic device 21 in the communication terminal 1 on the sending side, and the resultant signal light P1 and the reference light P2 are returned back to the to the communication terminal 2 on the receiving side. Therefore, the frequency of the signal light P1 and that of the reference light P2 are different from the frequency of backscattered light having a frequency equal to or lower than the frequency of the original signal light P1 and reference light P2. This frequency difference allows the interference between the reference light P2 and the backscattered light to be suppressed, and thus noise due to the interference between the reference light P2 and the backscattered light in the homodyne detection based on interference between the signal light P1 and reference light P2 performed by the homodyne detector 15 in the communication terminal 2 on the receiving side is minimized.

In the quantum cryptography communication apparatus 100A shown in FIG. 6, secret information can be shared by the communication terminal 1 on the sending side and the communication terminal 2 on the receiving side via a sequence described below with reference to FIGS. 7 to 9.

Figure 7:
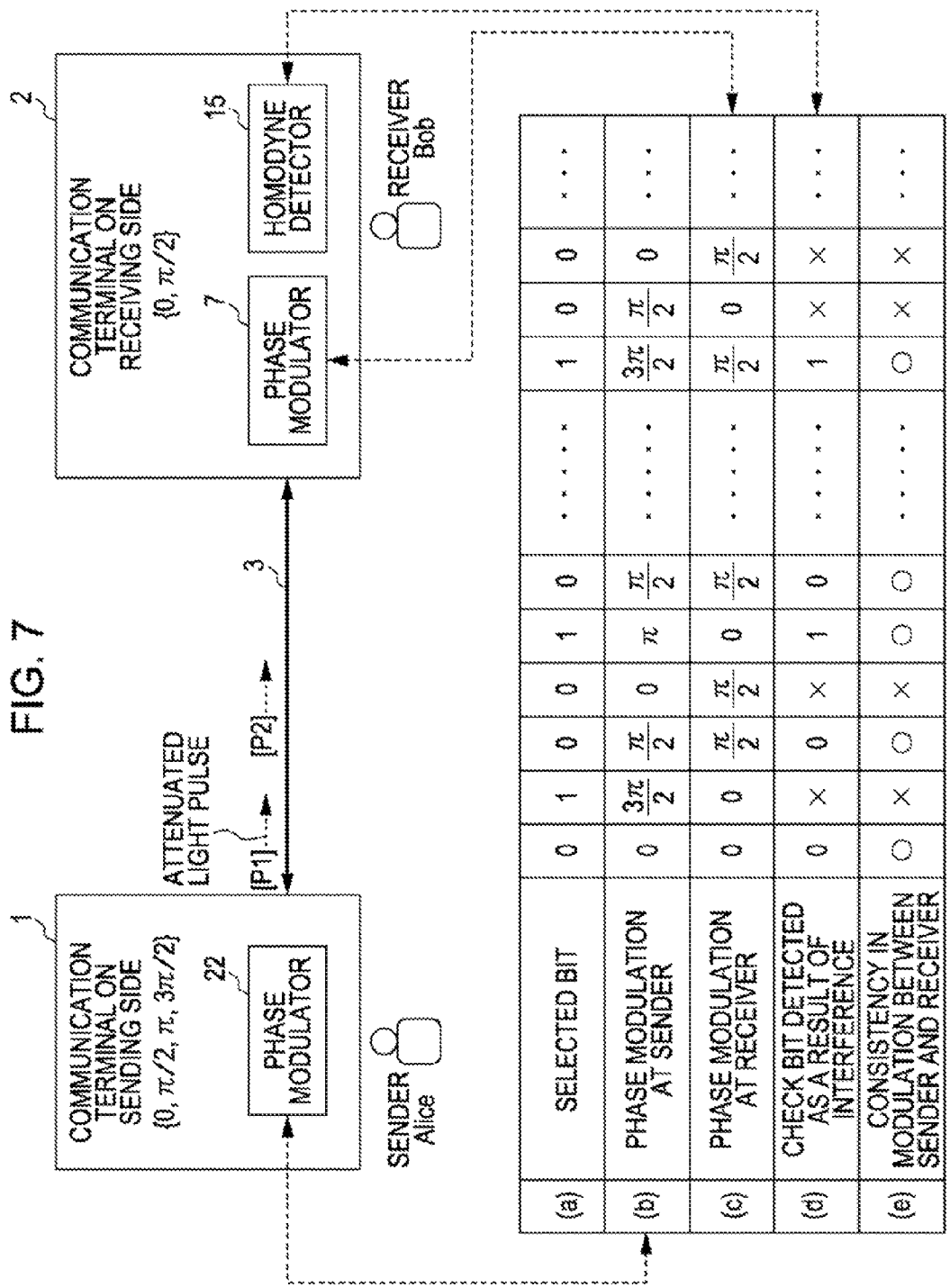
FIG. 7 is a diagram illustrating an information communication process using quantum cryptography.

First, as shown in FIG. 7, the signal light P1 and reference light P2 are output in the forward direction from the communication terminal 2 on the receiving side to the communication terminal 1 on the sending side. The signal light P1 and the reference light P2 are returned in the backward direction from the communication terminal 1 on the sending side to the communication terminal 2 on the receiving side. In the communication terminal 1 on the sending side, of the signal light P1 and reference light P2 received from the communication terminal 2 on the receiving side, the signal light P1 is phase-modulated by the phase modulator 22 by an angle selected from $\{0, \pi/2, \pi, 3\pi/2\}$. An example of a sequence of phase modulation is shown in row (b) of a table on the bottom of FIG. 7.

Note that the sequence of phase modulation (shown in the row (b) of the table on the bottom of FIG. 7) performed on the signal light P1 in the communication terminal 1 on the sending side may be randomly selected. Alternatively, a sequence of selection bits shown in row (a) of the table on the bottom of FIG. 7 may be first set, and the sequence of phase modulation may be determined depending on the sequence of selection bits, for example, such that the phase modulation is performed by 0 or $\pi 2$ for the bit 0 while by $\pi$ or $3\pi/2$ for the bit 1.

The signal light P1 subjected to the phase modulation is attenuated by the acousto-optic device 21 (FIG. 6) and returned to the communication terminal 2 on the receiving side. On the other hand, the reference light P2 is returned to the communication terminal 2 on the receiving side without being attenuated. The signal light P1 returned from the communication terminal 1 on the sending side to the communication terminal 2 on the receiving side is as low in intensity as having only one photon on average per pulse, while the reference light P2 returned from the communication terminal 1 on the sending side to the communication terminal 2 on the receiving side is as high in intensity as having 106 photons on average per pulse.

If the communication terminal 2 on the receiving side receives the returned signal light P1 and the returned reference light P2, the phase modulator 7 performs the phase modulation on the reference light P2 by an angle randomly selected from $\{0, \pi/2\}$ and the homodyne detector 15 measures the interference between the resultant modulated reference light P2 and the signal light P1

More specifically, for example, in the case where the phase modulator 7 in the communication terminal 2 on the receiving side performs the phase modulation as shown in row (c) in the table on the bottom of FIG. 7, a sequence of bits (check bits) shown in row (d) of the table is detected by the homodyne detector 15. In the sequence of check bits (d) detected as the result of the interference, 0s and 1s are bits detected in the homodyne detection, while symbols x in the row (d) denote bits undectable in the homodyne detection. Whether bits are distinguishable or not depends on the combination of the phase modulation performed in the communication terminal 1 on the sending side and the phase modulation performed in the communication terminal 2 on the receiving side.

For example, as shown in the row (d) of the table on the bottom of FIG. 7, the homodyne detector 15 in the communication terminal 2 on the receiving side detects bit 0 or bit 1 only when the combination of phase modulation satisfies the particular condition.

Figure 8:
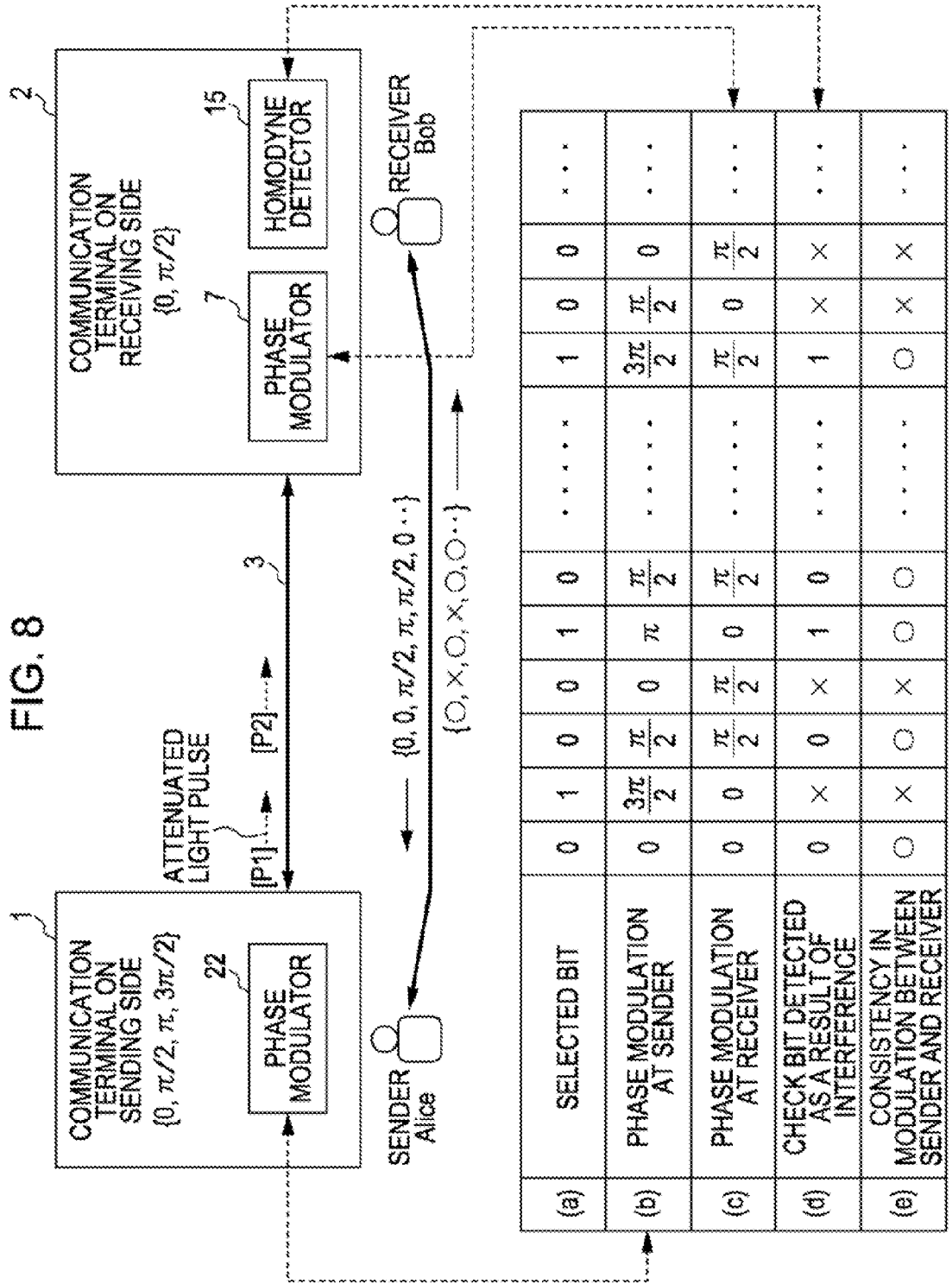
FIG. 8 is a diagram illustrating an information communication process using quantum cryptography.

Thereafter, as shown in FIG. 8, the communication terminal 2 on the receiving side sends data indicating the sequence of phase modification performed in the communication terminal 2 on the receiving side to the communication terminal 1 on the sending side. In the example shown in FIG. 8, {0, 0, π/2, π/2, 0 ... } shown in row (c) of the table on the bottom of FIG. 8 is sent.

Based on the information indicating the sequence of phase modulation received from the communication terminal 2 on the receiving side, the communication terminal 1 on the sending side generates information indicating positions at which modulation was correctly performed and thus bits were detected, and the communication terminal 1 on the sending side sends the generated information to the communication terminal 2 on the receiving side. In the example shown in FIG. 8, the information sequence {O, x, O, x, O, O} shown in the row (e) of the table shown on the bottom of FIG. 8 is sent. Note that the sequence of phase modification {0, 0, π/2, π/2, 0, ... } shown in the row (c) of the table in FIG. 8 and the information sequence {O, x, O, x, O, O} shown in the row (e) of the table in FIG. 8 may be transmitted respectively from the communication terminal 2 on the receiving side and the communication terminal 1 on the sending side via a public communication channel.

Figure 9:
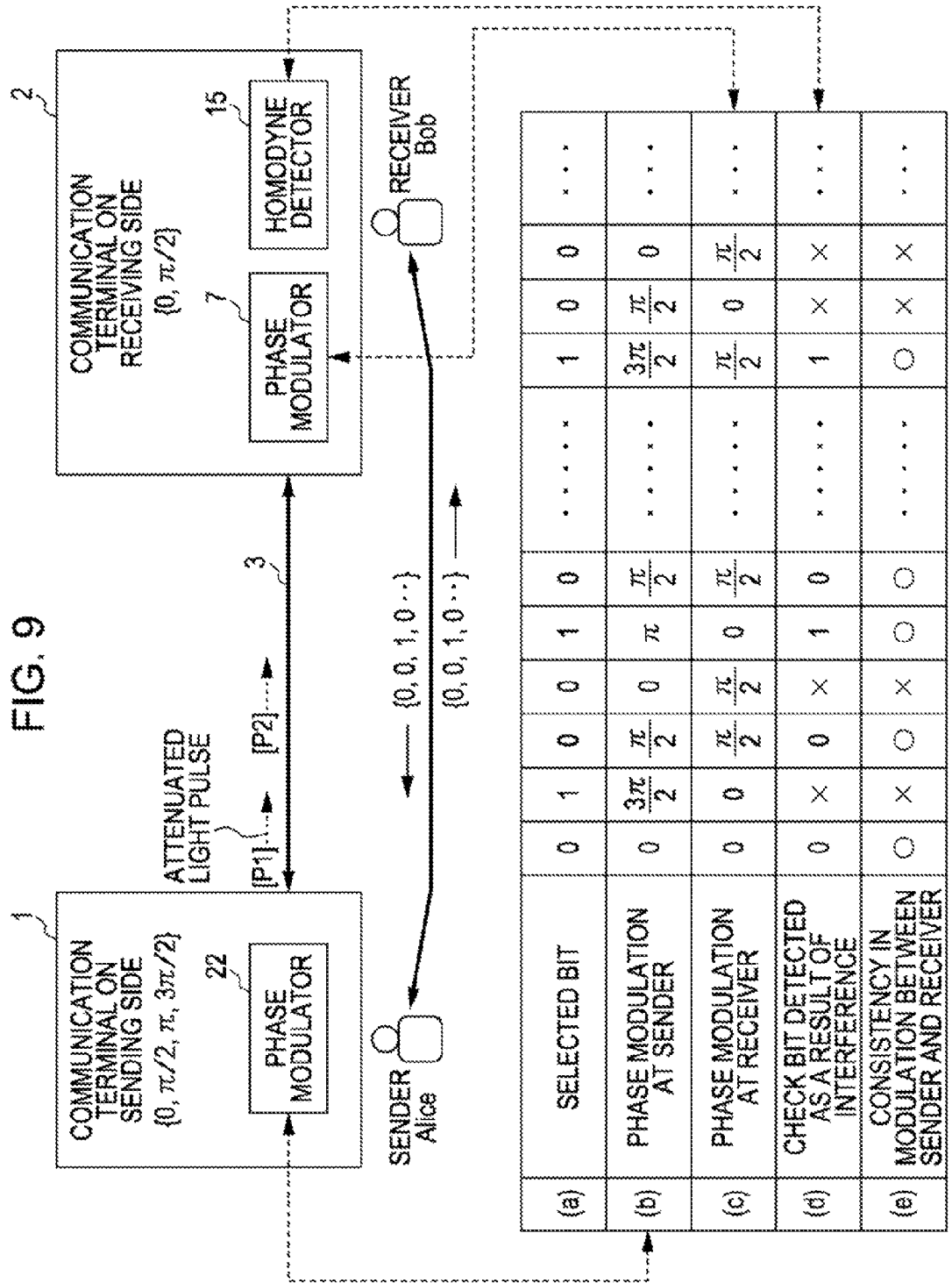
FIG. 9 is a diagram illustrating an information communication process using quantum cryptography.

Next, as shown in FIG. 9, the communication terminal 2 on the receiving side informs the communication terminal 1 on the sending side of the detected bit information sequence (that is, {0, 0, 1, 0 ... } in the present example). On the other hand, the communication terminal 1 on the sending side informs the communication terminal 2 on the receiving side of bit sequence information including only bits at positions at which bit-detectable modulation were performed in the communication terminal 2 on the receiving side. In the present example, a sequence of {0, 0, 1, 0 ... } is sent. That is, in the row (a) of the table shown in FIG. 9, bits are selected from those bits at positions corresponding to symbols 0 in the row (e) where phase modulation is matched between the sending side and the receiving side, and a sequence of the selected bits is transmitted. Also in this case, the transmission may be performed via a public communication channel.

When the communicating data transmitted via the communication channel 3 is not eavesdropped, sequences of detected bits mutually transmitted for confirmation as shown in FIG. 9A are equal to each other at all bits. However, if the communicating data transmitted via the communication channel 3 is eavesdropped, a difference occurs between sequences of detected bits mutually transmitted for confirmation, as shown in FIG. 10. This means that eavesdropping of data transmitted via the communication channel 3 results in a change in the modulation state. That is, no difference occurs between sequences of detected bits mutually transmitted for confirmation when the data transmitted via the communication channel 3 is not eavesdropped.

Via the data communication performed in the above-described manner, secret information such as a secret key used in the symmetric key cryptography can be shared. For example, to share a secret key with n bits, a confirmation is first made as to the equality between mutually transmitted bit sequences as described above with reference to FIG. 9. After the confirmation is made, n bits are selected from m bits (m>n) shared via the above-described process.

Specific example of quantum cryptography communication apparatus using the second scheme Next, a description is given below as to a specific example of a quantum cryptography communication apparatus using the second scheme in which arbitrary coherent states are used and measurement is performed in arbitrary phase directions.

Figures 11A, 11B:
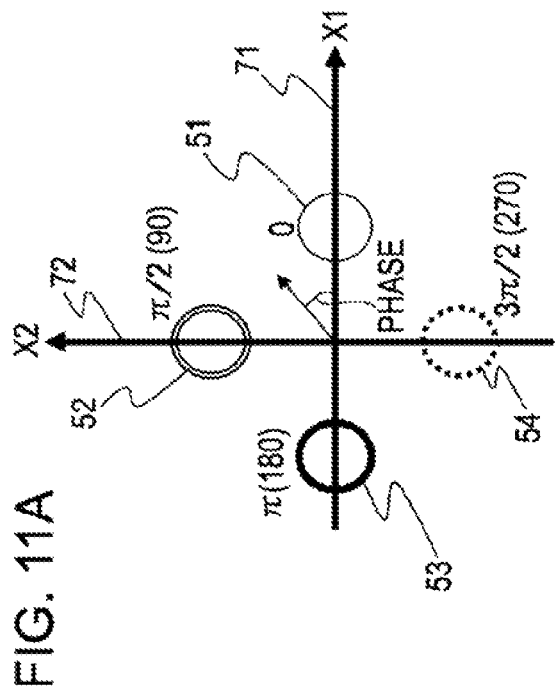
FIGS. 11A and 11B show data transmitted as effective information to be shared, in a scheme in which four phase-modulated weak coherent states are used.

Before the apparatus using the second scheme is explained, an explanation is given as to the coding efficiency in quantum cryptography using the first scheme described above. FIG. 11A shows four quantum states (coherent states) 51 to 54 of modulation signals generated in the phase modulation process performed on the sending side, and also shows two bases X1 (71) and X2 (72) used as the observation system in the phase modulation process performed on the receiving side.

When the basis (phase modulation mode applied on the receiving side) X1 71 is used as the observation system on the receiving side, of the four quantum states (coherent states) 51 to 54 obtained as a result of the phase modulation performed on the sending side, only the 0° phase modulation signal in the quantum state 51 and the 180° (π) phase modulation signal in the quantum state 53 can be detected, but the 90° (π/2) phase modulation signal in the quantum state 52 and the 270° (3π/2) phase modulation signal in the quantum state 54 cannot be detected. When the basis (phase modulation mode applied on the receiving side) X2 72 is used as the observation system on the receiving side, of the four quantum states 51 to 54 obtained as a result of the phase modulation performed on the sending side, only the 90° (π/2) phase modulation signal in the quantum state 52 and the 270° (3π/2) phase modulation signal in the quantum state 54 can be detected, but the 0° phase modulation signal in the quantum state 51 and the 180° (π) phase modulation signal in the quantum state 53 cannot be detected.

FIG. 11B is a table showing correspondence in terms of the states. In this table shown in FIG. 11B, angles of phase modulation ((A) performed on the data sending side are shown in a row (A), angles of phase modulation (SB) performed on the data receiving side are shown in a row (B), detected bits and information as to matching/mismatching in the basis are shown in a row (C), and the detectable bit ratio (basis matching ratio) is shown in a row (D).

As shown in the row (A) of the table, as a result of the phase modulation performed on the sending side, a phase modulation signal in one of the four quantum statues 51 to 54 (FIG. 11A) corresponding respectively to the four phase modulation angles (φA) is generated. That is, one of the following four phase modulation signals is generated: 0° phase modulation signal in the quantum state 51; 90° (π/2) phase modulation signal in the quantum state 52; 180° (π) phase modulation signal in the quantum state 53; and 270° (3π/2) phase modulation signal in the quantum state 54.

The row (B) shows the angles of phase modulation (φB) performed on the data receiving side, which correspond to two bases (phase modulation modes applied on the receiving side) employed as the observation system (shown in FIG. 11A) on the receiving side, that is, the basis (phase modulation mode applied on the receiving side) X1 71, and the basis (phase modulation mode applied on the receiving side) X2 72.

When the four phase modulation signals are arbitrarily and randomly selected on the sending side, and the two observation systems are randomly selected on the receiving side, eight combinations shown in FIG. 11B equally occur.

The row (C) in FIG. 11B shows detected bits and data as to the matching/mismatching in the basis. As described above, when the basis (phase modulation mode applied on the receiving side) X1 71 is used as the observation system on the receiving side, only the 0° phase modulation signal in the quantum state 51 and the 180° (π) phase modulation signal in the quantum state 53 can be detected, while when the basis (phase modulation mode applied on the receiving side) X2 72 is used as the observation system on the receiving side, only the 90° (π/2) phase modulation signal in the quantum state 52 and the 270° (3π/2) phase modulation signal in the quantum state 54 can be detected.

the observation system applied on the receiving side is referred to as the basis of phase modulation on the receiving side. When the basis allows the bit to be detected on the receiving side, the basis is said to be matched. On the other hand, when the basis does not allow the bit to be detected on the receiving side, the basis is said to be mismatched. As can be seen from FIG. 11B, of the total of eight combinations, the basis is matched in four combinations, but the basis is not matched in the other four combinations. Thus, as shown in the row (D) of the table shown in FIG. 11B, the probability that the basis is matched on the data receiving side and thus a bit can be detected is equal to ½ (50%).

The matching and mismatching of the basis are described in further detail below with reference to FIGS. 12A to 12D. FIG. 12A shows combinations of the amount of phase modulation performed on the sending side and the amount of phase modulation performed on the receiving side, in which the basis is matched.

That is, the basis is matched for the following four combinations. When the angle of phase modulation (φB) performed on the data receiving side is equal to n/2, and the angle of phase modulation (φA) performed on the data sending side is equal to π/2 or 3π/2, or when the angle of phase modulation (φB) performed on the data receiving side is equal to 0, and the angle of phase modulation (φA) performed on the data sending side is equal to 0 or π.

In any of these four combinations, the signal can be distinguishably detected on the receiving side, as shown in FIG. 12B. That is, when φ=|φA−φB| is given as data from which to distinguishably detect the signal, the bit value can be identified by determining whether the phase of the detection signal is φ=0 or φ=π. The process of detecting the signal when the basis is matched has been described above.

FIG. 12C shows combinations of the angle of phase modulation performed on the sending side and the angle of phase modulation performed on the receiving side, in which the basis is not matched.

That is, the basis is not matched in the following four combinations: when the angle of phase modulation performed on the receiving side is φB=0, and the angle of phase modulation performed on the sending side is φA=π/2 or 3π/2; and when the angle of phase modulation performed on the receiving side is φB=n/2, and the angle of phase modulation performed on the sending side is φA=0 or π.

In any of these combinations, as shown in FIG. 12D, the signal cannot be distinguishably detected on the receiving side. That is, when φ=|φA−φB| is given as data, only a signal with φ=±(π/2) is detected, and the bit value cannot be identified, because of mismatching of the basis.

When the basis is not matched, the signal cannot carry a bit value of the secret information to be shared by the data sending side and the data receiving side, and thus the signal is discarded. In other words, only when the basis is matched, the signal can carry a bit value of the secret information to be shared by the data sending side and the data receiving side. Of the signals that are phase-modulated on the sending side and transmitted to the receiving side, up to ½ of the signals can be effective, but the remaining signals are useless.

In contrast, in the second scheme, secret information is encrypted by quantum cryptography and sent from the sending side to the receiving side without generating a useless phase modulation signal. That is, the second scheme allows secret information to be shared in a very efficient manner by the sending and receiving sides.

The quantum cryptography communication apparatus using the second scheme is configured in a similar manner to the quantum cryptography communication apparatus 100A using the first scheme described above. However, in the quantum cryptography communication apparatus using the second scheme, the phase modulation by the phase modulator 22 in the communication terminal 1 on the sending side and the phase modulation by the phase modulator 7 in the communication terminal 2 on the receiving side are performed differently from the phase modulation process performed in the quantum cryptography communication apparatus 100A using the first scheme described above.

The phase modulation process using the second scheme is explained below. Quantum cryptography communication may be practiced in various modes depending on the number of quantum states realized by phase modulation. Examples of quantum cryptography communication processes in a four-state mode, a six-state mode, and an eight-state mode are described below.

Figure 13B:
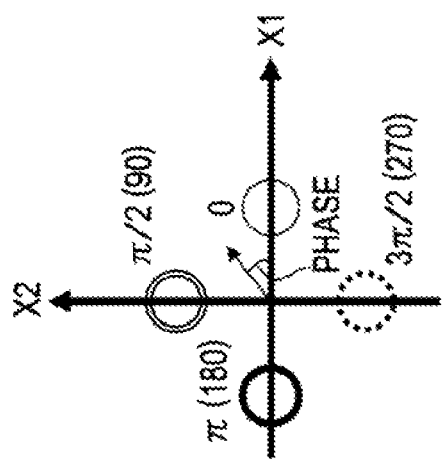
FIGS. 13A and 13B in a scheme in which arbitrary coherent states are used and measurement is performed using arbitrary modulation bases; are diagrams for explanation of a phase modulation process performed on a sending side and a phase modulation process performed on a receiving side in a mode in which four phase modulation states are used on a sending side and two phase modulation bases are used on a receiving side.
Figure 13A:
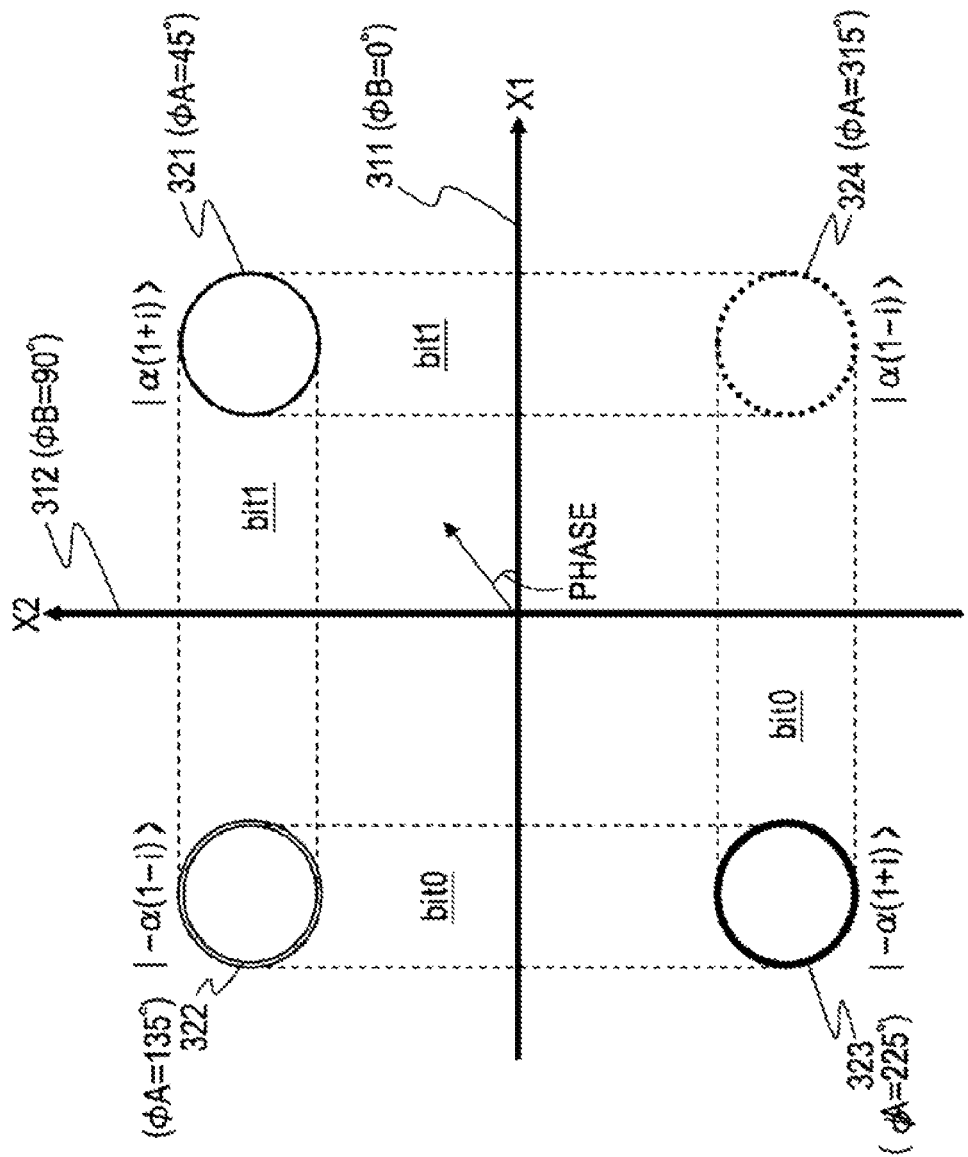

Quantum cryptography communication process in a mode in which four phase modulation states are used on sending side and two phase modulation bases are used on receiving side In this mode, in the quantum cryptography communication apparatus 100A shown in FIG. 6, phase modulation by the phase modulator 22 of the communication terminal 1 on the sending side and phase modulation by the phase modulator 7 of the communication terminal 2 on the receiving side are performed as described below with reference to FIGS. 13A and 13B.

FIG. 13A illustrates a phase modulation process in a mode in which eight phase modulation states are used on the sending side and two phase modulation bases are used on the receiving side. In FIG. 13A, four circles correspond to angles of phase modulation performed by the phase modulator 22 of the communication terminal 1 on the sending side. More specifically, these four circles respectively indicate quantum states (coherent states) of 45° modulation data 321, 1350 modulation data 322, 225° modulation data 323, and 315° modulation data 324. The distance from the origin to the center of each circle is proportional to the square root of the average number of photons in the coherent state corresponding to the circle. For any set of two circles, the angle between the line extending from the origin to the center of one circle and the line from the origin to the center of the other circle indicates the phase difference between corresponding two coherent states. The radius of each circle indicates the fluctuation of the corresponding quantum state.

In the quantum cryptography communication apparatus 100A using the homodyne detection shown in FIG. 6, on the sending side, a coherent state is randomly selected from the four coherent states respectively corresponding to amounts of phase modulation 45°, 135°, 225°, and 315° performed by the phase modulator 22, and light in the selected coherent state is transmitted. On the receiving side, the light is phase-modulated by the phase modulator 7 by 0° or 90°, and homodyne detection is performed by the homodyne detector 15 including photodiodes, an amplifier, etc.

Figure 14:
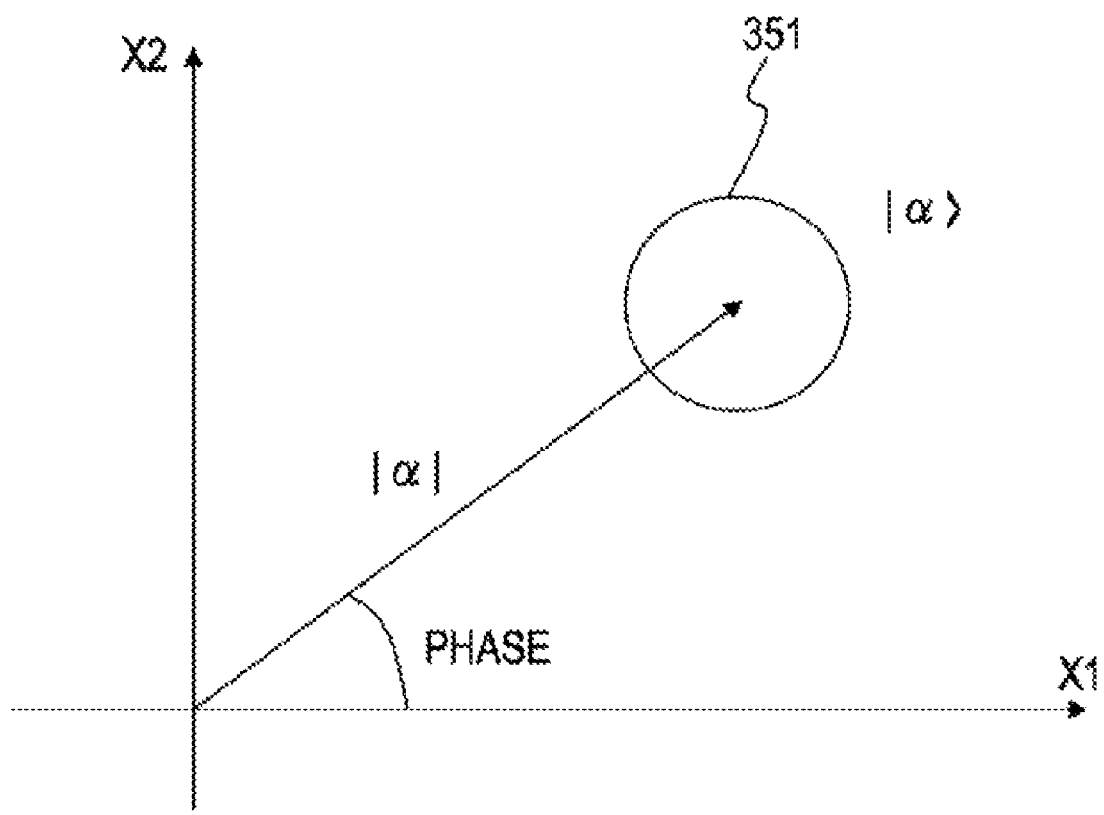
FIG. 14 is an explanation of a description of a coherent state.

With reference to FIG. 14, the representation of coherent states shown in FIG. 13A is explained. When the quantum state of laser light is coherent, the coherent state can be expressed by a function called a Wigner function in a two-dimensional plane, as described below:

$$W(x,y)=(2/\pi)\exp(-2(x1-X)2-2(x2-Y)2)$$

In this calculation, $\alpha=X+iY$ is referred to as the complex amplitude of the coherent state. $\tan\phi=X/Y$, and thus $\alpha=|\alpha|e^{i\phi}$ The phase modulation of a light pulse refers to changing the value of the phase $\phi$. On the other hand, the intensity modulation refers to changing the magnitude $|\alpha|$ of $\alpha$. $n=|\alpha 2|$ corresponds to the average number of photons in a coherent state, that is, the average number of photons included in a light pulse, and indicates the strength of the energy of the light pulse.

The coherent state can be schematically represented by contour lines of the Wigner function. In FIG. 14, in the two-dimensional plane where the Wigner function is defined, a circle 351 is a contour line indicating a range within which a quantum state fluctuates. The coherent state inside this circle 351 is represented by $|\alpha\rangle$. At the center of this circle 351, phase=$\phi$. The distance from the origin to the center of the circle 351 is equal to the magnitude $|\alpha|$ of the complex amplitude of the coherent state and is proportional to the square root of the average number of photons in the coherent state.

Referring again to FIG. 13, a further explanation is given below as to the process in the mode in which the four phase modulation states are used on the sending side and the two phase modulation bases are used on the receiving side. On the receiving side, the phase modulation by the phase modulator 7 of the communication terminal 2 on the receiving side is performed by an angle of either 0° or 90°. These two phases respectively correspond to bases (used in the phase modulation performed on the receiving side) represented by orthogonal axes X1 and X2 shown in FIG. 13. That is, the 0° phase modulation corresponds to the basis X1 (311), and the 90° phase modulation corresponds to the basis X2 (312).

In the present description, the observation system applied on the receiving side is referred to as the basis of phase modulation on the receiving side. In the present mode, two phase modulation bases are used on the receiving side. That is, the present mode has four phase modulation states on the sending side and two phase modulation bases on the receiving side.

For the purpose of comparison, FIG. 13B shows a phase modulation process using the first scheme described above. As can be seen from the comparison of FIGS. 13A and 13B, in the first scheme, light is phase-modulated by the phase modulator on the sending side by an angle selected from {0°, 90° ($\pi/2$), 180° ($\pi$), 270° ($3\pi/2$)} to put the light into a corresponding one of the four coherent states, and the resultant light is transmitted. On the receiving side, the light is phase-modulated by the phase modulator 7 by an angle selected from {0°, 90° ($\pi/2$)}, and homodyne detection is performed.

In contrast, in the present mode according to the present embodiment, as shown in FIG. 13A, on the sending side, a coherent state is randomly selected from the four coherent states respectively corresponding to amounts of phase modulation 45° ($\pi/4$), 135° ($3\pi/4$), 225° ($5\pi/4$), and 315° ($\pi/4$) performed by the phase modulator 22, and light in the selected coherent state is transmitted. On the receiving side, the light is phase-modulated by the phase modulator 7 by 0° or 90° ($\pi/2$), and homodyne detection is performed by the homodyne detector 15.

In the phase modulation according to the first scheme shown in FIG. 13B, as described above, information can be shared only when the basis is matched. That is, information can be shared only when the combination of the angle of phase modulation ($\phi$A) performed on the sending side and the angle of phase modulation ($\phi$B) performed on the receiving side is one of the following four combinations: the angle of phase modulation ($\phi$B) performed on the data receiving side is equal to $\pi/2$, and the angle of phase modulation ($\phi$A) performed on the data sending side is equal to $\pi/2$ or $3\pi/2$, or when the angle of phase modulation ($\phi$B) performed on the data receiving side is equal to 0, and the angle of phase modulation performed on the sending side is $\phi$A=0 or $\pi$. However, information cannot be shared in any other combination in which the basis is not matched.

In the present embodiment of the invention, although on the receiving side, the phase modulation is performed by 0 or 90° as with the first scheme, the phase modulation on the sending side is performed by one of 45°, 135°, 225°, and 315°, which are different from the phase modulation angles in the first scheme.

More specifically, on the data sending side, 45°, 135°, 225°, and 315° are defined as a set of angles of phase modulation corresponding to quantum states (coherent states). These angles of phase modulation are randomly selected, and phase modulation is performed by the selected angles by the phase modulator 22 of the communication terminal 1 on the sending side, and the resultant phase-modulated light is transmitted. For example, on the data sending side, a sequence of numbers randomly selected from four values 0, 1, 2, and 3 is generated, and the values 0, 1, 2, and 3 are respectively assigned to the amounts of phase modulator 45°, 135°, 225°, and 315°. Furthermore, phase modulation is performed by angles sequentially determined in accordance with the sequence of random numbers, and a resultant phase modulation signal is transmitted.

On the data receiving side, the finite number of coherent states of data received from the data sending side are observed. The observation process includes the following steps: a) a plurality of bases for use as the observation system are set, that is, bases (applied in the phase modulation performed on the receiving side) respectively corresponding to the amounts of phase modulations 0° and 90° are set, and b) homodyne detection is performed by randomly selecting the plurality of observation systems, that is, the bases corresponding to the respective amounts of phase modulation 0° and 90°.

The observation process described above is performed as the homodyne detection process using the randomly selected bases (corresponding to the respective angles of phase modulation) by the phase modulator 7 of the communication terminal 2 on the receiving side.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the four quantum states (coherent states) corresponding to 45°, 135°, 225°, and 315° applied on the data receiving side, and information indicating the assigned bit values is transmitted to the receiving side.

In the present mode, in the case in which phase modulation of 0° (X1 axis) is used in the measurement performed on the receiving side, a bit 1 is assigned to coherent states of 45° and 315° and a bit 0 is assigned to coherent states of 135° and 225° on the sending side. That is, if the phase modulation of 0° is performed, that is, the basis X1 311 shown in FIG. 13A is used in the measurement performed on the receiving side, then, on the sending side, the bit 1 is assigned to the two coherent states of the 45° modulation data 321 and the 315° modulation data 324, and the bit 1 is assigned to the two coherent states of the other data, that is, the 135° modulation data 322 and the 225° modulation data 323.

In the case in which phase modulation of 90° (X2 axis) is used in the measurement performed on the receiving side, a bit 1 is assigned to the coherent states of 45° and 135°, and a bit 0 is assigned to the coherent states of 225° and 315° on the sending side. That is, if the phase modulation of 90°, that is, the basis X2 (312) shown in FIG. 13A is used in the measurement performed on the receiving side, then, on the sending side, the bit 1 is assigned to the 45° modulation data 321 and the 135° modulation data 322 in the respective two coherent states, and the bit 0 is assigned to the 225° modulation data 323 and the 315° modulation data 324 in the respective two other coherent states.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, two bit values are assigned to four respective states, the probability that transmission does not make a contribution to sharing of information such as a common secret key because of mismatching of the basis between the sending side and the receiving side can be reduced to 0.

Referring to FIGS. 15A to 15C, the coding efficiency of the quantum cryptography according to the present embodiment of the invention is described below. FIG. 15A shows an example in which phase modulation of 0° (X1 axis) is employed in the measurement performed on the receiving side. In this figure, circles 321 to 324 correspond to angles of phase modulation performed by the phase modulator 22 of the communication terminal 1 on the sending side. More specifically, these four circles respectively indicate 45° modulation data 321, 135° modulation data 322, 225° modulation data 323, and 315° modulation data 324. In the case in which phase modulation of 0° (the phase amplitude X1) is used in the measurement performed on the receiving side, bit values are assigned as follows: 45° modulation data 321=bit 1; 315° modulation data 324=bit 1; 135° modulation data 322=bit 0; and 225° modulation data 323=bit 0.

FIG. 15B shows an example in which phase modulation of 90° (X2 axis) is employed in the measurement performed on the receiving side. In this case, bit values are assigned as follows: 45° modulation data 321=bit 1; 135° modulation data 322=bit 1; 225° modulation data 323=bit 0; and 315° modulation data 324=bit 0.

FIG. 15C is a table showing correspondence in terms of the states. In this table shown in FIG. 15C, angles of phase modulation ($\phi$A) performed on the data sending side are shown in a row (A), angles of phase modulation ($\phi$B) performed on the data receiving side are shown in a row (B), shared bits are shown in a row (C), and the sharable bit ratio is shown in a row (D).

More specifically, the row (A) shows angles of phase modulation ($\phi$A) employed in the phase modulation process (shown in FIGS. 15A and 15B) performed on the data sending side to obtain four respective modulation signals, that is, 45° modulation data 321, 135° modulation data 322, 225° modulation data 323, and 315° modulation data 324.

The row (B) shows the angles of phase modulation ($\phi$B) performed on the data receiving side, which correspond to two bases employed as observation systems (shown in FIGS. 15A and 15B) on the receiving side. As shown, the angle of phase modulation performed on the data receiving side is equal to 0° or 90°.

When four phase modulation signals ($\phi$A=45°, 135°, 225°, 315°) are arbitrarily and randomly selected on the sending side, and two angles of phase modulation ($\phi$B=0°, 90°) are randomly selected as the observation system on the receiving side, eight combinations shown in FIG. 15C equally occur.

The row (C) of the table shown in FIG. 15C indicates bit information shared by both sender and receiver. As described earlier, the assignment of the bit values is changed depending on the observation system employed on the receiving side so that bit value sharing is possible in any of the eight combinations. That is, bit value sharing is possible in any of eight combinations of the angle of phase modulation (performed on the sending side) selected from the four values and the angle of phase modulation (performed on the receiving side) selected from the two values, and thus the sharable information ratio is 100% as indicated in the row (D).

The communication terminal 2 on the receiving side detects and identifies the signal, as shown in FIG. 16. More specifically, the data used to identify the signal is the difference, $\phi=|\{\phi A - \phi B|\}$, between the angle of phase modulation ($\phi$A) performed on the data sending side and the angle of phase modulation ($\phi$B) performed on the data receiving side. The bit value can be identified by determining whether the phase of the detection signal is $\phi=0$ or $\phi=\pi$. As shown in FIG. 16, the bit value is determined based on an observed value and predetermined threshold values (X0 and −X0), and the determined bit value is shared.

Quantum Cryptography Communication Process with Three Phase Modulation States on Sending Side and Three Phase Modulation Bases on Receiving Side In the quantum cryptography communication apparatus 100A described above with reference to FIG. 6, a quantum cryptography communication process may be performed in a mode in which three phase modulation states are used on the sending side and three phase modulation bases are used on the receiving side according to an embodiment. In this mode, phase modulation by the phase modulator 22 of the communication terminal 1 on the sending side and phase modulation by the phase modulator 7 of the communication terminal 2 on the receiving side are performed as described below with reference to FIG. 17.

Figure 17:
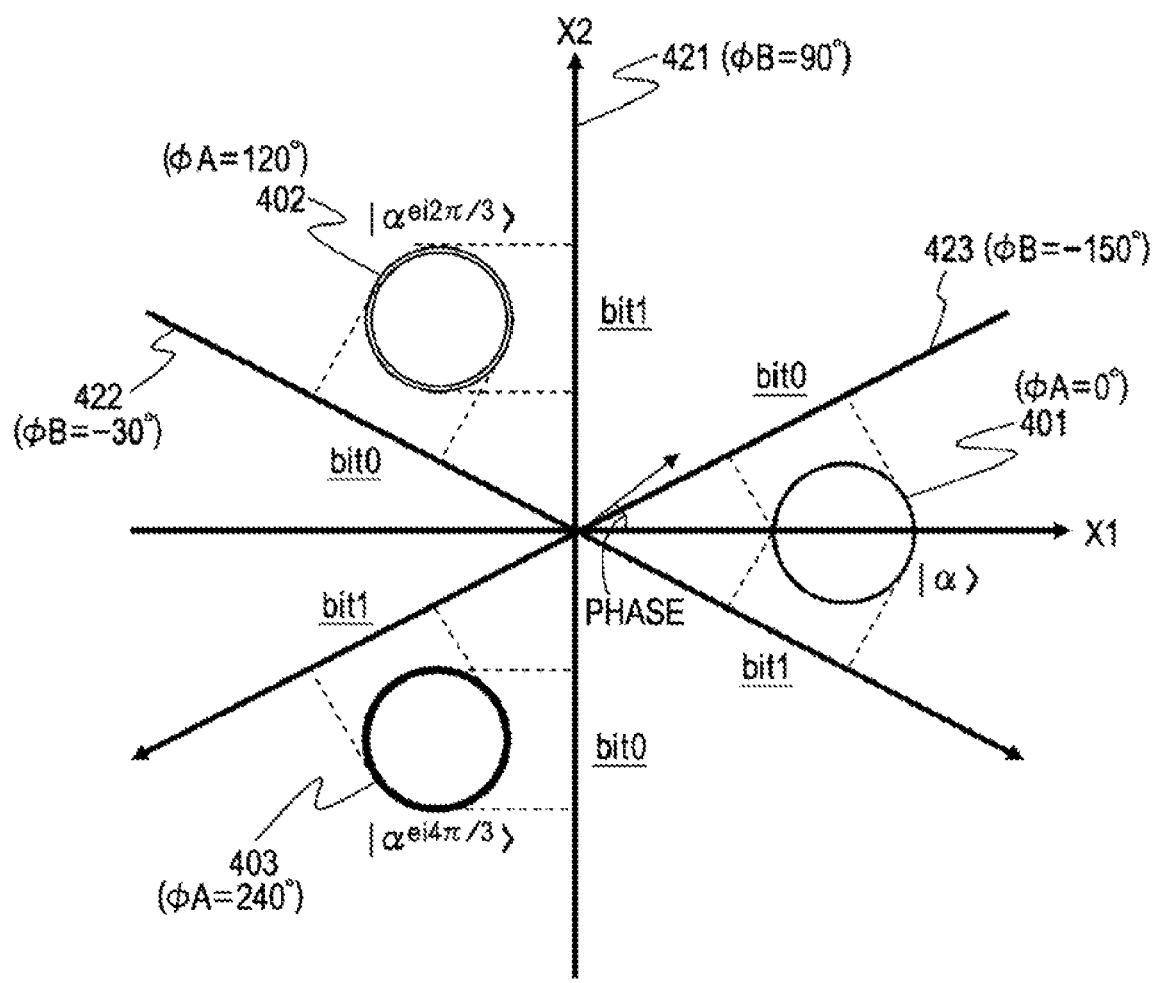
FIG. 17 is a diagram for explanation of a phase modulation process performed on a sending side and a phase modulation process performed on a receiving side in a mode in which three phase modulation states are used on a sending side and three phase modulation bases are used on a receiving side, in a scheme in which arbitrary coherent states are used and measurement is performed using arbitrary modulation bases.

Three circles 401 to 403 shown in FIG. 17 correspond to angles of phase modulation performed by the phase modulator 22 of the communication terminal 1 on the sending side. More specifically, these three circles respectively indicate quantum states (coherent states) of 0° modulation data 321, 120° modulation data 322, and 240° modulation data 323. The distance from the origin to the center of each circle is proportional to the square root of the number of photons in the coherent state corresponding to the circle. The radius of each circle indicates the fluctuation of the corresponding quantum state.

On the receiving side, the phase modulation by the phase modulator 7 of the communication terminal 2 on the receiving side is performed by an angle selected from {90°, −30°, −150°}. These three phases respectively correspond to a basis (used in the phase modulation performed on the receiving side) represented by an axis 421 ($\phi$B=90°), a basis (used in the phase modulation performed on the receiving side) represented by an axis 422 (φB=−30°), and a basis (used in the phase modulation performed on the receiving side) represented by an axis 423 (φB=−150°), shown in FIG. 17.

In the quantum cryptography communication apparatus 100A using the homodyne detection shown in FIG. 6, on the sending side, a coherent state is randomly selected from the three coherent states respectively corresponding to amounts of phase modulation 0°, 120°, and 240° performed by the phase modulator 22, and light in the selected coherent state is transmitted. On the receiving side, the light is phase-modulated by the phase modulator 7 by one of angels 90°, −30°, and −150°, and homodyne detection is performed by the homodyne detector 15 including photodiodes, an amplifier, etc.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the respective quantum states (coherent states) corresponding to 0°, 120°, and 240° applied on the data receiving side, and information indicating the assigned bit values is transmitted to the receiving side.

In the present embodiment, in the case in which phase modulation of 90° (X2 axis) is used in the measurement performed on the receiving side, a bit 1 is assigned to the coherent state of 120°, and a bit 0 is assigned to the coherent state of 240° on the sending side. That is, if the measurement is performed using the basis (phase modulation on the receiving side) 421 corresponding to the 90° phase modulation axis (φB=90°) shown in FIG. 17, then, on the sending side, the bit 1 is assigned to the coherent state of the 120° modulation data 402, and the bit 0 is assigned to the coherent state of the 240° modulation data 403. The coherent state of the 0° modulation data 401 is treated as being undetectable because of the mismatching of the basis.

In the case in which phase modulation of −30° is used in the measurement performed on the receiving side, a bit 1 is assigned to the coherent state of 0°, and a bit 0 is assigned to the coherent state of 120° on the sending side. That is, if the measurement is performed using the basis (phase modulation on the receiving side) 422 corresponding to the −30° phase modulation axis (φB=−30°) shorn in FIG. 17, then, on the sending side, the bit 1 is assigned to the coherent state of the 0° modulation data 401, and the bit 0 is assigned to the coherent state of the 120° modulation data 402. The coherent state of the 240° modulation data 403 is treated as being undetectable because of the mismatching of the basis.

In the case in which phase modulation of −150° is used in the measurement performed on the receiving side, a bit 1 is assigned to the coherent state of 240°, and a bit 0 is assigned to the coherent state of 0° on the sending side. That is, if the measurement is performed using the basis (phase modulation on the receiving side) 423 corresponding to the −150° phase modulation axis (φB=−150°) shown in FIG. 17, then, on the sending side, the bit 1 is assigned to the coherent state of the 240° modulation data 403, and the bit 0 is assigned to the coherent state of the 0° modulation data 401. The coherent state of the 120° modulation data 402 is treated as being undetectable because of the mismatching of the basis.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, different bit values are assigned to two of the three respective quantum states transmitted from the sending side, it is possible to use two of the three quantum states to transmit information to be shared. In this encoding scheme, the probability that transmission does not make a contribution to sharing of information such as a common secret key because of mismatching of the basis between the sending side and the receiving side can be reduced to ⅓.

Referring to FIG. 18, the coding efficiency in the present embodiment is described. In a table shown in FIG. 18, angles of phase modulation (φA) performed on the data sending side are shown in a row (A), angles of phase modulation (φB) performed on the data receiving side are shown in a row (B), shared bits are shown in a row (C), and the sharable bit ratio is shown in a row (D).

More specifically, row (A) shows angles of phase modulation (φA) employed in the phase modulation process (shown in FIG. 17) performed on the data sending side to obtain three respective modulation signals, that is, 0° modulation data 401, the 120° modulation data 402, and the 240° modulation data 403.

The row (B) shows the angles of phase modulation (φB) performed on the data receiving side, which correspond to three bases employed as observation systems (shown in FIG. 17) on the receiving side. As shown, the angle of phase modulation performed on the data receiving side is equal to 90°, −30°, or −150°.

When the three phase modulation signals (φA=0°, 120°, 240°) are arbitrarily and randomly selected on the sending side, and three angles of phase modulation (φB=00°, −30°, −150°) are randomly selected on the receiving side, nine combinations shown in FIG. 18 equally occur.

The row (C) of the table shown in FIG. 18 indicates bit information shared by both sender and receiver. As described earlier, the assignment of the bit values is changed depending on the observation system employed on the receiving side so that bit value sharing is possible in six combinations of the total of nine combinations. That is, bit value sharing is possible in six combinations of the total of nine combinations in terms of the angle of phase modulation (performed on the sending side) selected from the three values and the angle of phase modulation (performed on the receiving side) selected from the three values, although bit value sharing is impossible in the remaining three combinations because of the mismatching of the basis. Thus the sharable information ratio is as high as ⅔ as indicated in the row (D).

The communication terminal 2 on the receiving side detects and identifies the signal, as shown in FIG. 16. More specifically, the data used to identify the signal is the difference, φ=|{φA−φB|, between the angle of phase modulation (φA) performed on the data sending side and the angle of phase modulation (φB) performed on the data receiving side. The bit value is identified by checking the phase of the detection signal, that is, by determining whether φ mod 2π=π/6 or φ mod 2π=5π/6. As shown in FIG. 16, the bit value is determined based on an observed value and predetermined threshold values (X0 and −X0), and the determined bit value is shared.

Quantum Cryptography Communication Process with Six Phase Modulation States on Sending Side and Three Phase Modulation Bases on Receiving Side In the quantum cryptography communication apparatus 100A described above with reference to FIG. 6, a quantum cryptography communication process may be performed in a mode in which six phase modulation states are used on the sending side and three phase modulation bases are used on the receiving side according to an embodiment of the present invention. In this mode, phase modulation by the phase modulator 22 of the communication terminal 1 on the sending side and phase modulation by the phase modulator 7 of the communication terminal 2 on the receiving side are performed as described below with reference to FIG. 19.

Six circles 431 to 436 shown in FIG. 19 correspond to angles of phase modulation performed by the phase modulator 22 of the communication terminal 1 on the sending side. More specifically, these six circles respectively indicate quantum states (coherent states) of 0° modulation data 431, 60° modulation data 432, 120° modulation data 433, 180° modulation data 434, 240° modulation data 435, and 300° modulation data 436. The distance from the origin to the center of each circle is proportional to the square root of the number of photons in the coherent state corresponding to the circle. The radius of each circle indicates the fluctuation of the corresponding quantum state.

On the receiving side, the phase modulation by the phase modulator 7 of the communication terminal 2 on the receiving side is performed by an angle of one of 90°, −30°, and −150°. These three phases respectively correspond to a basis (used in the phase modulation performed on the receiving side) represented by an axis 441 ($\phi B=90°$), a basis (used in the phase modulation performed on the receiving side) represented by an axis 442 ($\phi B=-30°$), and a basis (used in the phase modulation performed on the receiving side) represented by an axis 443 ($\phi B=-150°$), shown in FIG. 19.

In the quantum cryptography communication apparatus 100A using the homodyne detection shown in FIG. 6, on the sending side, a coherent state is randomly selected from the six coherent states respectively corresponding to amounts of phase modulation 0°, 60°, 120°, 180°, 240°, and 300° performed by the phase modulator 22, and light in the selected coherent state is transmitted. On the receiving side, a basis is randomly selected from the bases respectively corresponding to the amounts of phase modulation 90°, −30°, and −150°, and phase modulation is performed by the phase modulator 7 by using the selected basis, and homodyne detection is performed by the homodyne detector 15 including photodiodes, an amplifier, etc.

The data receiving; apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the respective quantum states (coherent states) corresponding to 0°, 60°, 120°, 180°, 240°, and 300° applied on the data receiving side, and, information indicating the assigned bit values is transmitted to the receiving side.

In the present mode, in the case in which phase modulation of 90° (X2 axis) is used in the measurement performed on the receiving side, a bit 1 is assigned to the coherent states of 60° and 120°, and a bit 0 is assigned to the coherent states of 240° and 300° on the sending side. That is, if the measurement is performed using the basis (phase modulation on the receiving side) 441 corresponding to the 90° phase modulation axis ($\phi B=90°$) shown in FIG. 19, then, on the sending side, the bit 1 is assigned to the respective two coherent states of the 60° modulation data 432 and the 120° modulation data 433, and the bit 0 is assigned to the respective two coherent states of the 240° modulation data 435 and the 300° modulation data 436. The coherent states of the 0° modulation data 431 and the 180° modulation data 434 are treated as being undetectable because of the mismatching of the basis.

If phase modulation is performed by −30° on the receiving side, that is, if the measurement is performed using the basis (phase modulation on the receiving side) 442 corresponding to the −30° phase modulation axis ($\phi B=-30°$) shown in FIG. 19, then, on the sending side, the bit 1 is assigned to the respective two coherent states of the 0° modulation data 431 and the 300° modulation data 436, and the bit 0 is assigned to the respective two coherent states of the 120° modulation data 433 and the 180° modulation data 434. The coherent states of the 60° modulation data 432 and the 240° modulation data 435 are treated as being undetectable because of the mismatching of the basis.

If phase modulation is performed by −150° on the receiving side, that is, if the measurement is performed using the basis (phase modulation on the receiving side) 443 corresponding to the −150° phase modulation axis ($\phi B=-150°$) shown in FIG. 19, then, on the sending side, the bit 1 is assigned to the respective two coherent states of the 180° modulation data 434 and the 240° modulation data 435, and the bit 0 is assigned to the respective two coherent states of the 0° modulation data 431 and the 60° modulation data 432. The coherent states of the 120° modulation data 433 and the 300° modulation data 436 are treated as being undetectable because of the mismatching of the basis.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, bit values are assigned to respective four of the six quantum states transmitted from the sending side, it is possible to use four of the six quantum states to transmit information to be shared. In this encoding scheme, the probability that transmission does not make a contribution to sharing of information such as a common secret key because of mismatching of the basis between the sending side and the receiving side can be reduced to ⅓.

Referring to FIG. 20, the coding efficiency in the present embodiment is described. In a table shown in FIG. 20, angles of phase modulation ($\phi A$) performed on the data sending side are shown in a row (A), angles of phase modulation (SB) performed on the data receiving side are shown in a row (B), shared bits are shown in a row (C), and the sharable bit ratio is shown in a row (D).

More specifically, row (A) shows angles of phase modulation ($\phi A$) employed in the phase modulation process (shown in FIG. 19) performed on the data sending side to obtain six respective modulation signals, that is, 0° modulation data 431, 60° modulation data 432, 120° modulation data 433. 180° modulation data 434, 240° modulation data 435, and 300° modulation data 436.

The row (B) shows the angles of phase modulation ($\phi B$) performed on the data receiving side, which correspond to three bases employed as observation systems (shown in FIG. 19) on the receiving side. As shown, the angle of phase modulation performed on the data receiving side is equal to 90°, −30°, or −150°.

When the six phase modulation signals ($\phi A=0°$, 60°, 120°, 180°, 240°, 300°) are arbitrarily and randomly selected on the sending side, and three angles of phase modulation ($\phi B=90°$, −30°, −150°) are randomly selected on the receiving side, eighteen combinations shown in FIG. 20 equally occur.

The row (C) of the table shown in FIG. 18 indicates bit information shared by both sender and receiver. As described earlier, the assignment of the bit values is changed depending on the observation system employed on the receiving side so that bit value sharing is possible in twelve combinations of the total of eighteen combinations. That is, bit value sharing is possible in twelve combinations of the total of eighteen combinations in terms of the angle of phase modulation (performed on the sending side) selected from the six values and the angle of phase modulation (performed on the receiving side) selected from the three values, although bit value sharing is impossible in the remaining six combinations because of the mismatching of the basis. Thus the sharable information ratio is as high as ⅔ as indicated in the row (D).

The communication terminal 2 on the receiving side detects and identifies the signal, as shown in FIG. 16. More specifically, the data used to identify the signal is the difference, $\phi = |\{\phi A - \phi B\}|$, between the angle of phase modulation ($\phi A$) performed on the data sending side and the angle of phase modulation ($\phi B$) performed on the data receiving side. The bit value is identified by checking the phase of the detection signal, that is, by determining whether $\phi$ mod $\pi = \pi/6$ or $\phi$ mod $\pi = 5\pi/6$. As shown in FIG. 16, the bit value is determined based on an observed value and predetermined threshold values (X0 and −X0), and the determined bit value is shared.

Quantum Cryptography Communication Process with Eight Phase Modulation States on Sending Side and Two Phase Modulation Bases on Receiving Side In the quantum cryptography communication apparatus 100A described above with reference to FIG. 6, a quantum cryptography communication process may be performed in a mode in which eight phase modulation states are used on the sending side and two phase modulation bases are used on the receiving side according to an embodiment of the present invention. In this mode, phase modulation by the phase modulator 22 of the communication terminal 1 on the sending side and phase modulation by the phase modulator 7 of the communication terminal 2 on the receiving side are performed as described below with reference to FIG. 21.

Eight circles 421 to 428 shown in FIG. 21 correspond to angles of phase modulation performed by the phase modulator 22 of the communication terminal 1 on the sending side. More specifically, these eight circles respectively indicate quantum states (coherent states) of 0° modulation data 521, 45° modulation data 522, 90° modulation data 523, 1350 modulation data 524, 180° modulation data 525, 225° modulation data 526, 270° modulation data 527, and 315° modulation data 528. The distance from the origin to the center of each circle is proportional to the square root of the number of photons in the coherent state corresponding to the circle. The radius of each circle indicates the fluctuation of the corresponding quantum state.

On the receiving side, the phase modulation by the phase modulator 7 of the communication terminal 2 on the receiving side is performed by an angle of either 0° or 90°. These two phases respectively correspond to a basis (used in the phase modulation performed on the receiving side) represented by an axis X1 541 ($\phi B = 0°$), and a basis (used in the phase modulation performed on the receiving side) represented by an axis X2 542 ($\phi B = 90°$).

The distance from the origin to the center of each circle corresponds to the square root of the average number of photons in the coherent state corresponding to the circle. In the present mode, the distance from the origin to the circle center is different between a group including 0° modulation data 521, 90° modulation data 523, 180° modulation data 525, and 270° modulation data 527 and a group including 45° modulation data 522, 135° modulation data 524, 225° modulation data 526, and 315° modulation data 528, and thus the average numbers of photons in the corresponding coherent states are different between these two groups.

To this end, the communication terminal 1 on the sending side has to change the number of photons depending on the coherent state shown in FIG. 21. The number of photons can be changed by controlling the attenuation factor or the transmittance of the acousto-optic device 21 depending on the type of the modulation data.

In the quantum cryptography communication apparatus 100A using the balanced homodyne detection shown in FIG. 6, the phase modulator 22 on the sending side performs phase modulation by an angle selected from {0°, 45°, 90°, 135°, 180°, 225°, 270°, 315°}, and the acousto-optic device 21 performs the intensity modulation. Thus, coherent states are randomly selected from the eight states and sent to the receiving side. On the receiving side, a basis is randomly selected from the bases respectively corresponding to the amounts of phase modulation 0° and 90°, and phase modulation is performed by the phase modulator 7 by using the selected basis, and homodyne detection is performed by the homodyne detector 15 including photodiodes, an amplifier, etc.

The communication terminal on the receiving side transmits, to the communication terminal on the sending side, measurement mode information indicating the observation systems, that is, the bases used in the phase modulation process on the receiving side. On the sending side, depending on the phase modulation performed on the receiving side, bit values are assigned to the respective quantum states (coherent states) corresponding to 0°, 45°, 90°, 135°, 180°, 225°, 270° and 315° applied on the data receiving side, and information indicating the assigned bit values is transmitted to the receiving side.

In the present mode, in the case in which phase modulation of 0° (X1 axis) is used in the measurement performed on the receiving side, a bit 1 is assigned to coherent states of 0°, 45°, and 315°, and a bit 0 is assigned to coherent states of 135°, 180°, and 225° on the sending side. That is, if the measurement is performed using the basis (phase modulation on the receiving side) 541 corresponding to the 0° phase modulation axis ($\phi B = 0°$) shown in FIG. 21, then, on the sending side, the bit 1 is assigned to the respective three coherent states of the 0° modulation data 521, the 45° modulation data 522, and the 315° modulation data 528, and the bit 0 is assigned to the respective three coherent states of the 135° modulation data 524, the 180° modulation data 525, and the 225° modulation data 526. The coherent states of the 90° modulation data 523 and the 270° modulation data 527 are treated as being undetectable because of the mismatching of the basis.

In the case in which phase modulation of 90° (X2 axis) is used in the measurement performed on the receiving side, a bit 1 is assigned to the coherent states of 45°, 90°, and 135°, and a bit 0 is assigned to the coherent states of 225°, 270°, and 315° on the sending side. That is, if the measurement is performed using the basis (phase modulation on the receiving side) 542 corresponding to the 90° phase modulation axis ($\phi B = 90°$) shown in FIG. 21, then, on the sending side, the bit 1 is assigned to the respective coherent states of the 45° modulation data 522, the 90° modulation data 523, and the 135° modulation data 524, and the bit 0 is assigned to the respective coherent states of the 225° modulation data 526, the 270° modulation data 527, and the 315° modulation data 528. The coherent states of the 0° modulation data 521 and the 180° modulation data 525 are treated as being undetectable because of the mismatching of the basis.

After data is transmitted from the communication terminal on the sending side, the communication terminal on the sending side receives the measurement mode information from the communication terminal on the receiving side and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, bit values are assigned to respective six of the eight quantum states transmitted from the sending side, it is possible to use six of the eight quantum states to transmit information to be shared. In this encoding scheme, the probability that transmission does not make a contribution to sharing of information such as a shared private key because of mismatching of the basis between the sending side and the receiving side can be reduced to ¼.

Referring to FIG. 22, the coding efficiency in the present embodiment is described. In a table shown in FIG. 22, angles of phase modulation (φA) performed on the data sending side are shown in a row (A), angles of phase modulation (φB) performed on the data receiving side are shown in a row (B), shared bits are shown in a row (C), and the sharable bit ratio is shown in a row (D).

More specifically, the row (A) shows angles of phase modulation (φA) employed in the phase modulation process (shown in FIG. 21) performed on the data sending side to obtain eight respective modulation signals, that is, 0° modulation data 521, 45° modulation data 522, 90° modulation data 523, 135° modulation data 524, 180° modulation data 525, 225° modulation data 526, 270° modulation data 527, and 315° modulation data 528.

The row (B) shows the angles of phase modulation (φB) performed on the data receiving side, which correspond to two bases employed as observation systems (shown in FIG. 21) on the receiving side. As shown, the angle of phase modulation performed on the data receiving side is equal to 0° or −90°.

When eight phase modulation signals (φA=0°, 45°, 90°, 135°, 180°, 225°, 270°, 315°) are arbitrarily and randomly selected on the sending side, and two angles of phase modulation (φB=0°, 90°) are randomly selected on the receiving side, sixteen combinations shown in FIG. 22 equally occur.

The row (C) of the table shown in FIG. 22 indicates bit information shared by both sender and receiver. As described earlier, the assignment of the bit values is changed depending on the observation system employed on the receiving side so that bit value sharing is possible in twelve combinations of the total of sixteen combinations. That is, bit value sharing is possible in twelve combinations of the total of sixteen combinations in terms of the angle of phase modulation (performed on the sending side) selected from the eight values and the angle of phase modulation (performed on the receiving side) selected from the two values, although bit value sharing is impossible in the remaining four combinations because of the mismatching of the basis. Thus the sharable information ratio is as high as ¾ as indicated in the row (D).

The communication terminal 2 on the receiving side detects and identifies the signal, as shown in FIG. 16. More specifically, the data used to identify the signal is the difference, φ=|{φA−φB|, between the angle of phase modulation (φA) performed on the data sending side and the angle of phase modulation (φB) performed on the data receiving side.

The bit value is identified by checking the phase of the detection signal, that is, by determining whether φ mod π=0, π/4 or 3π/4. As shown in FIG. 16, the bit value is determined based on an observed value and predetermined threshold values (X0 and −X0), and the determined bit value is shared.

Quantum Cryptography Communication Process with Eight Phase Modulation States on Sending Side and Four Phase Modulation Bases on Receiving Side In the quantum cryptography communication apparatus 100A described above with reference to FIG. 6, a quantum cryptography communication process may be performed in a mode in which eight phase modulation states are used on the sending side and four phase modulation bases are used on the receiving side according to an embodiment of the present invention. In this mode, phase modulation by the phase modulator 22 of the communication terminal 1 on the sending side and phase modulation by the phase modulator 7 of the communication terminal 2 on the receiving side are performed as described below with reference to FIG. 23.

Although the present mode is similar to the previous mode in that the mode has eight phase modulation states on the sending side, the intensity modulation, that is, the adjustment of the number of photons is not performed in the present mode.

Figure 23:
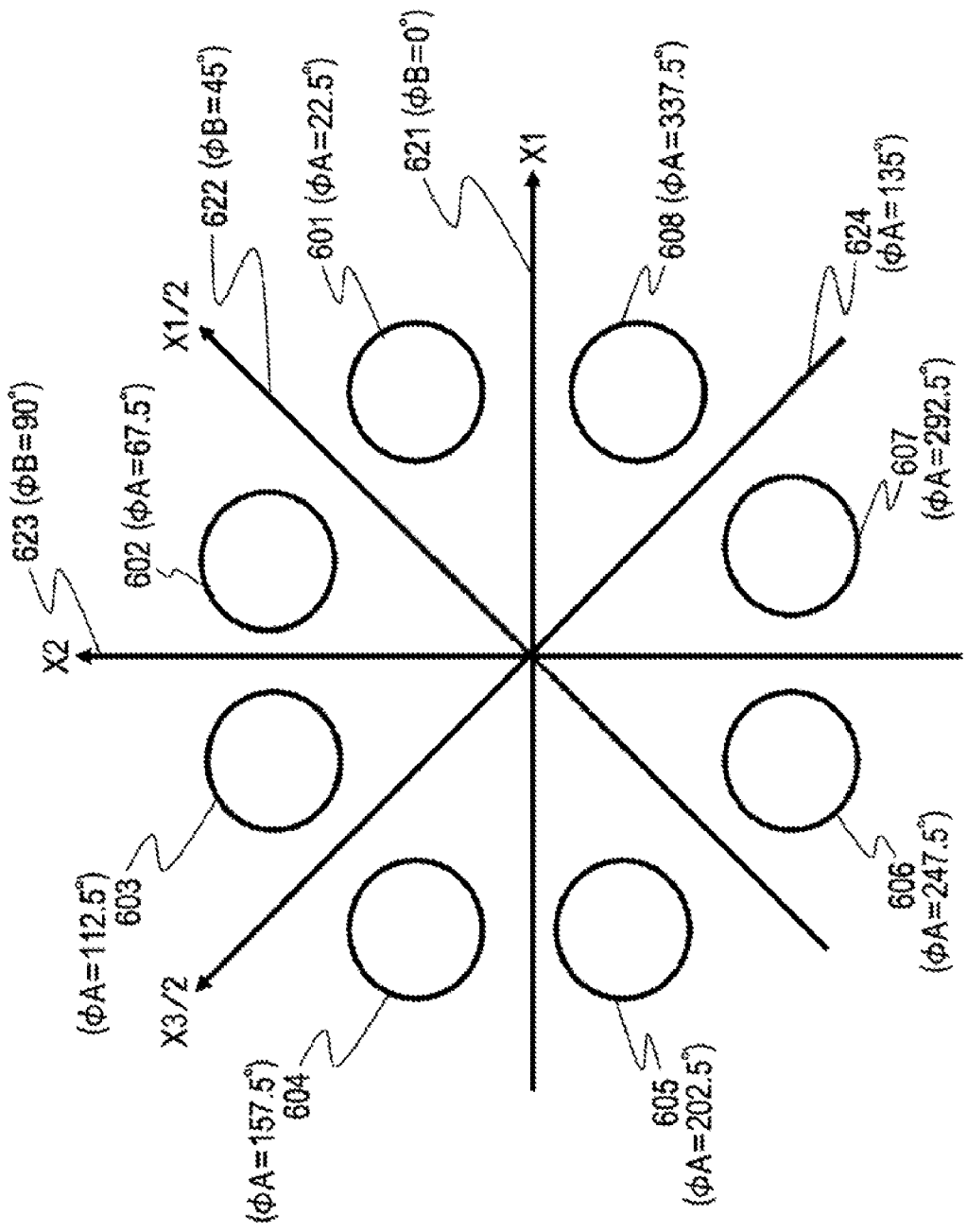
FIG. 23 is a diagram for explanation of a phase modulation process performed on a sending side and a phase modulation process performed on a receiving side in a mode in which eight phase modulation states are used on a sending side and four phase modulation bases are used on a receiving side, in a scheme in which arbitrary coherent states are used and measurement is performed using arbitrary modulation bases.

Eight circles 601 to 608 shown in FIG. 23 correspond to angles of phase modulation performed by the phase modulator 22 of the communication terminal 1 on the sending side. More specifically, these eight circles respectively indicate quantum states (coherent states) of 22.5° modulation data 601, 67.5° modulation data 602, 112.5° modulation data 603, 157.5° modulation data 604, 202.5° modulation data 605, 247.5° modulation data 606, 292.5° modulation data 607, and 337.5° modulation data 628. The distance from the origin to the center of each circle is proportional to the square root of the number of photons in the coherent state corresponding to the circle. The radius of each circle indicates the fluctuation of the corresponding quantum state.

On the receiving side, the phase modulation by the phase modulator 7 of the communication terminal 2 on the receiving side is performed by an angle of one of 0°, 45°, 90°, and 135°. These four phases respectively correspond to a basis (used in the phase modulation performed on the receiving side) represented by an axis X1 621 (φB=0°), a basis (used in the phase modulation performed on the receiving side) represented by an axis X1/2 622 (φB=45°), a basis (used in the phase modulation performed on the receiving side) represented by an axis X2 623 (φB=90°), and a basis (used in the phase modulation performed on the receiving side) represented by an axis X3/2 624 (φB=135°). In the present mode, the distance from the origin to the center of each circle is set to be equal to each other, and thus the number of photons is equal in any coherent state, and the intensity modulation by the acousto-optic device 21 is not necessary.

In the present embodiment, on the sending side, a coherent state is randomly selected from the eight coherent states respectively corresponding to amounts of phase modulation 22.5°, 67.5°, 112.5°, 157.5°, 202.5°, 247.5°, 292.5°, and 337.5° performed by the phase modulator 22, and light in the selected coherent state is transmitted. On the receiving side, a basis is randomly selected from the bases respectively corresponding to the amounts of phase modulation 0°, 45°, 90°, and 135°, and phase modulation is performed by the phase modulator 7 by using the selected basis, and homodyne detection is performed by the homodyne detector 15 including photodiodes, an amplifier, etc.

The communication terminal on the receiving side transmits, to the communication terminal on the sending side, measurement mode information indicating the observation systems, that is, the bases used in the phase modulation process on the receiving side. On the sending side, depending on the phase modulation performed on the receiving side, bit values are assigned to the respective quantum states (coherent states) corresponding to 22.5°, 67.5°, 112.5°, 157.5°, 202.5°, 247.5°, 292.5°, and 337.5° applied on the data receiving side, and, information indicating the assigned bit values is transmitted to the receiving side.

In the present mode, in the case in which phase modulation of 0° (X1 axis) is used in the measurement performed on the receiving side, a hit 1 is assigned to coherent states of 22.5°, 67.5°, 292.5°, and 337.5°, and a bit 0 is assigned to the coherent states of 112.5°, 157.5°, 202.5°, and 247.5° on the sending side. That is, if the measurement is performed using the basis (phase modulation on the receiving side) 621 corresponding to the 0° phase modulation axis (φB=0°) shown in FIG. 23, then, on the sending side, the bit 1 is assigned to the respective four coherent states of 22.5° modulation data 601, 67.5° modulation data 602, 292.5° modulation data 607, and the 337.5° modulation data 608, and the bit 0 is assigned to the respective four coherent states of 112.5° modulation data 603, 157.5° modulation data 604, 202.5° modulation data 605, and 247.5° modulation data 606.

In the case in which phase modulation of 45° (X1/2 axis) is used in the measurement performed on the receiving side, then, on the sending side, the bit 1 is assigned to the coherent states of 22.5°, 67.5°, 112.5°, and 337.5°, and a bit 1 is assigned to the coherent state of 157.5°, 202.5°, 247.5°, and 292.5°. That is, if the measurement is performed using the basis (phase modulation on the receiving side) 622 corresponding to the 45° phase modulation axis (φB=45°) shown in FIG. 23, then, on the sending side, the bit 1 is assigned to the respective four coherent states of 22.5° modulation data 601, 67.5° modulation data 602, 112.5° modulation data 603, and the 337.5° modulation data 608, and the bit 0 is assigned to the respective four coherent states of 157.5° modulation data 604, 202.5° modulation data 605, 247.5° modulation data 606, and 292.5° modulation data 607.

In the case in which phase modulation of 90° (X2 axis) is used in the measurement performed on the receiving side, then, on the sending side, the bit 1 is assigned to coherent states of 22.5°, 67.5°, 112.5°, and 157.5° and the bit 0 is assigned to coherent states of 202.5°, 247.5°, 292.5°, and 337.5°. That is, if the measurement is performed using the basis (phase modulation on the receiving side) 623 corresponding to the 90° phase modulation axis (φB=90°) shown in FIG. 23, then, on the sending side, the bit 1 is assigned to four coherent states of 22.5° modulation data 601, 67.5° modulation data 602, 112.5° modulation data 603, and 157.5° modulation data 604, and the bit 0 is assigned to four coherent states of 202.5° modulation data 605, 247.5° modulation data 606, 292.5° modulation data 607, and 337.5° modulation data 608.

In the case in which phase modulation of 135° (X3/2 axis) is used in the measurement performed on the receiving side, then, on the sending side, the bit 1 is assigned to coherent states of 67.5°, 112.5°, 157.5°, and 202.5°, and the bit 0 is assigned to coherent states of 22.5°, 247.5°, 292.5°, and 337.5°. That is, if the measurement is performed using the basis (phase modulation on the receiving side) 624 corresponding to the 135° phase modulation axis (φB=135°) shown in FIG. 23, then, on the sending side, the bit 1 is assigned to four coherent states of 67.5° modulation data 602, 112.5° modulation data 603, 157.5° modulation data 604, and 202.5° modulation data 605 and the bit 0 is assigned to coherent states of 22.5° modulation data 601, 247.5° modulation data 606, 292.5° modulation data 607, and 337.5° modulation data 608.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, bit values are assigned to all respective eight quantum states transmitted from the sending side, it is possible to use all these eight quantum states to transmit information to be shared. In this encoding scheme, the probability that transmission does not make a contribution to sharing of information such as a common secret key because of mismatching of the basis between the sending side and the receiving side can be reduced to 0.

Referring to FIG. 24, the coding efficiency in the present embodiment is described. In a table shown in FIG. 24, angles of phase modulation (φA) performed on the data sending side are shown in a row (A), angles of phase modulation (φB) performed on the data receiving side are shown in a row (B), shared bits are shown in a row (C), and the sharable bit ratio is shown in a row (D).

More specifically, row (A) shows angles of phase modulation (φA) employed in the phase modulation process (shown in FIG. 23) performed on the data sending side to obtain eight respective modulation signals, that is, 22.5° modulation data 601, 67.5° modulation data 602, 112.5° modulation data 603, 157.5° modulation data 604, 202.5° modulation data 605, 247.5° modulation data 606, 292.5° modulation data 607, and 337.5° modulation data 608.

The row (B) shows the angles of phase modulation (φB) performed on the data receiving side, which correspond to four bases employed as observation systems (shown in FIG. 23) on the receiving side. As shown, the angle of phase modulation performed on the data receiving side is equal to 0°, 45°, 90°, or 135°.

In the case where eight phase modulation signals (φA=22.5°, 67.5°, 112.5°, 157.50, 202.50, 247.5°, 292.50, 337.5°) are arbitrarily and randomly selected on the sending side, and four angles of phase modulation (φB=0°, 45°, 90°, 135°) are randomly selected on the receiving side, thirty-two combinations shown in FIG. 24 equally occur.

The row (C) of the table shown in FIG. 22 indicates bit information shared by both sender and receiver. As described earlier, the assignment of the bit values is changed depending on the observation system employed on the receiving side so that bit value sharing is possible in any of the thirty two combinations. That is, bit value sharing is possible in any of thirty two combinations of the angle of phase modulation (performed on the sending side) selected from the eight values and the angle of phase modulation (performed on the receiving side) selected from the four values, and thus the sharable information ratio is 100% as indicated in the row (D). In other words, there is no transmitted data that does not contribute to sharing of the secret information. Furthermore, the large number of states and the large number of required measurements make it difficult to eavesdrop the information. The reduction in the possibility of being eavesdropped results in an increase in security.

Quantum cryptography communication process in a general mode in which N phase modulation states are used The quantum cryptography communication process has been described above, by way of example, for specific modes of (1) the mode in which four phase modulation states are used on the sending side and two phase modulation bases are used on the receiving side, (2) the mode in which three phase modulation states are used on the sending side and three phase modulation bases are used on the receiving side, (3) the mode in which six phase modulation states are used on the sending side and three phase modulation bases are used on the receiving side, (4) the mode in which eight phase modulation states are used on the sending side and two phase modulation bases are used on the receiving side, and (5) the mode in which eight phase modulation states are used on the sending side and four phase modulation bases are used on the receiving side. However, the second scheme according to the present invention is not limited to these modes, but various other modes are possible. Some examples of other possible modes are described below.

(A) Mode in which 4N phase modulation states are used on the sending side and two phase modulation bases are used on the receiving side In the quantum cryptography communication apparatus 100A described above with reference to FIG. 6, a quantum cryptography communication process may be performed in a mode in which 4N phase modulation states are used by the phase modulator 22 of the communication terminal 1 on the sending side and two phase modulation bases are used by the phase modulator 7 of the communication terminal 2 on the receiving side, where N is a positive integer (N=1, 2, . . . ).

The phase modulator 22 of the communication terminal 1 on the sending side performs phase modulation by an angle equal to $(\pi/2N)j+(\pi/4N)$, where j is randomly selected from 0, 1, . . . , 4N−1.

The phase modulator 7 of the communication terminal 2 on the receiving side performs homodyne detection by performing phase modulation by an amount equal to 0° or 90°.

When N=1, the present mode is equivalent to the above-described mode in which four phase modulation states are used on the sending side and two phase modulation bases are used on the receiving side. In this case, as described above with reference to FIG. 15, the sharable information ratio, that is, the ratio of bit information that can be shared by both the sending side and the receiving side from transmission data can be 100%. That is, information can be transmitted efficiently without transmitting any useless data.

(B) Mode in which 4N phase modulation states are used on the sending side and 2N phase modulation bases are used on the receiving side In the quantum cryptography communication apparatus 100A described above with reference to FIG. 6, a quantum cryptography communication process may be performed in a mode in which 4N phase modulation states are used by the phase modulator 22 of the communication terminal 1 on the sending side and 2N phase modulation bases are used by the phase modulator 7 of the communication terminal 2 on the receiving side, where N is a positive integer (N=1, 2, . . . ).

The phase modulator 22 of the communication terminal 1 on the sending side performs phase modulation by an angle equal to $(\pi/2N)j+(\pi/4N)$, where j is randomly selected from 0, 1, . . . , 4N−1.

The phase modulator 7 of the communication terminal 2 on the receiving side performs homodyne detection by performing phase modulation by an amount of $(\pi/2N)k^o$, where k is randomly selected from 0, 1, . . . , 2N−1.

When N=1, the present mode is equivalent to the above-described mode in which four phase modulation states are used on the sending side and two phase modulation bases are used on the receiving side. In this case, the sharable information ratio, that is, the ratio of bit information that can be shared by both the sending side and the receiving side from transmission data can be 100%. That is, information can be transmitted efficiently without transmitting any useless data.

When N=2, the present mode is equivalent to the above-described mode in which eight phase modulation states are used on the sending side and four phase modulation bases are used on the receiving side. In this case, the sharable information ratio, that is, the ratio of bit information that can be shared by both the sending side and the receiving side from transmission data can be 100%. Furthermore, the large number of coherent states and the large number of required measurements make it difficult to eavesdrop the information. The reduction in the possibility of being eavesdropped results in an increase in security.

The two modes described above cannot be equivalent to all modes described earlier. The modes according to the present invention can be further generalized as follows.

On the data sending side, a set of quantum states (coherent states) used to transmit data is defined. More specifically, a set of quantum states (coherent states) used to transmit data is defined as follows.

a) An integer M $\{\geqq\}$ 2 is selected.

b) An angle of phase modulation is randomly selected to be equal to an integral multiple of $2\pi/M$.

c) The phase modulation is performed by the phase modulator 22 in the communication terminal 1 on the sending side shown in FIG. 6, by the angle selected above in (b), and the resultant modulated light is transmitted.

In the case in which it is necessary to adjust the number of photons to achieve particular quantum states (coherent states) as described above with reference to FIG. 21, the number of photons is adjusted (the intensity is modulated) by the acousto-optic device 21.

On the data receiving side, the finite number of coherent states of data received from the data sending side are observed. The observation process includes the following steps: a) two or more bases used as an observation system (in the phase modulation process) is defined; and b) homodyne detection is performed using an observation system randomly selected from the two or more observation bases defined above. The observation process described above is performed as the homodyne detection process using the randomly selected bases (corresponding to the respective angles of phase modulation) by the phase modulator 7 of the communication terminal 2 on the receiving side described above with reference to FIG. 6.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the transmitted respective quantum states (coherent states) corresponding to integral multiples of $2\pi/M$ where M is an integer ($\geqq 2$) defined on the sending side. Thereafter, information indicating the assigned bit values is transmitted to the receiving side. However, no bit value is assigned to a quantum state determined to be difficult to measure using the selected bases (in a phase modulation process) on the receiving side.

Information can be shared as described below depending on the mode.

In the mode in which four phase modulation states are used on the sending side and two phase modulation bases are used on the receiving side, bit information is assigned to all four phase modulation states on the sending side, and all four phase modulation states can carry effective bit information. That is, all transmitted data can contribute to sharing of data by the sending side and the receiving side (FIG. 15).

In the mode in which three phase modulation states are used on the sending side and three phase modulation bases are used on the receiving side, bit information is assigned to ⅔ of a total of three phase modulation states on the sending side, and ⅔ of the total of three phase modulation states generated on the sending side can carry effective bit information. That is, ⅔ of transmitted data can contribute to sharing of data by the sending side and the receiving side (FIG. 18).

In the mode in which six phase modulation states are used on the sending side and three phase modulation bases are used on the receiving side, bit information is assigned to ⅔ of a total of six phase modulation states on the sending side, and ⅔ of the total of six phase modulation states generated on the sending side can carry effective bit information. That is, ⅔ of transmitted data can contribute to sharing of data by the sending side and the receiving side (FIG. 20).

In the mode in which eight phase modulation states are used on the sending side and two phase modulation bases are used on the receiving side, bit information is assigned to ¾ of a total of eight phase modulation states on the sending side, and ¾ of the total of eight phase modulation states generated on the sending side can carry effective bit information. That is, ¾ of transmitted data can contribute to sharing of data by the sending side and the receiving side (FIG. 22).

In the mode in which eight phase modulation states are used on the sending side and four phase modulation bases are used on the receiving side, bit information is assigned to all of a total of eight phase modulation states on the sending side, and all phase modulation states can carry effective bit information. That is, all transmitted data can contribute to sharing of data by the sending side and the receiving side (FIG. 24). In this mode, the information sharing ratio is 100%. Furthermore, the large number of states and the large number of required measurements make it difficult to eavesdrop the information. The reduction in the possibility of being eavesdropped results in an increase in security.

Embodiment using a single-photon quantum key distribution protocol

Figure 25:
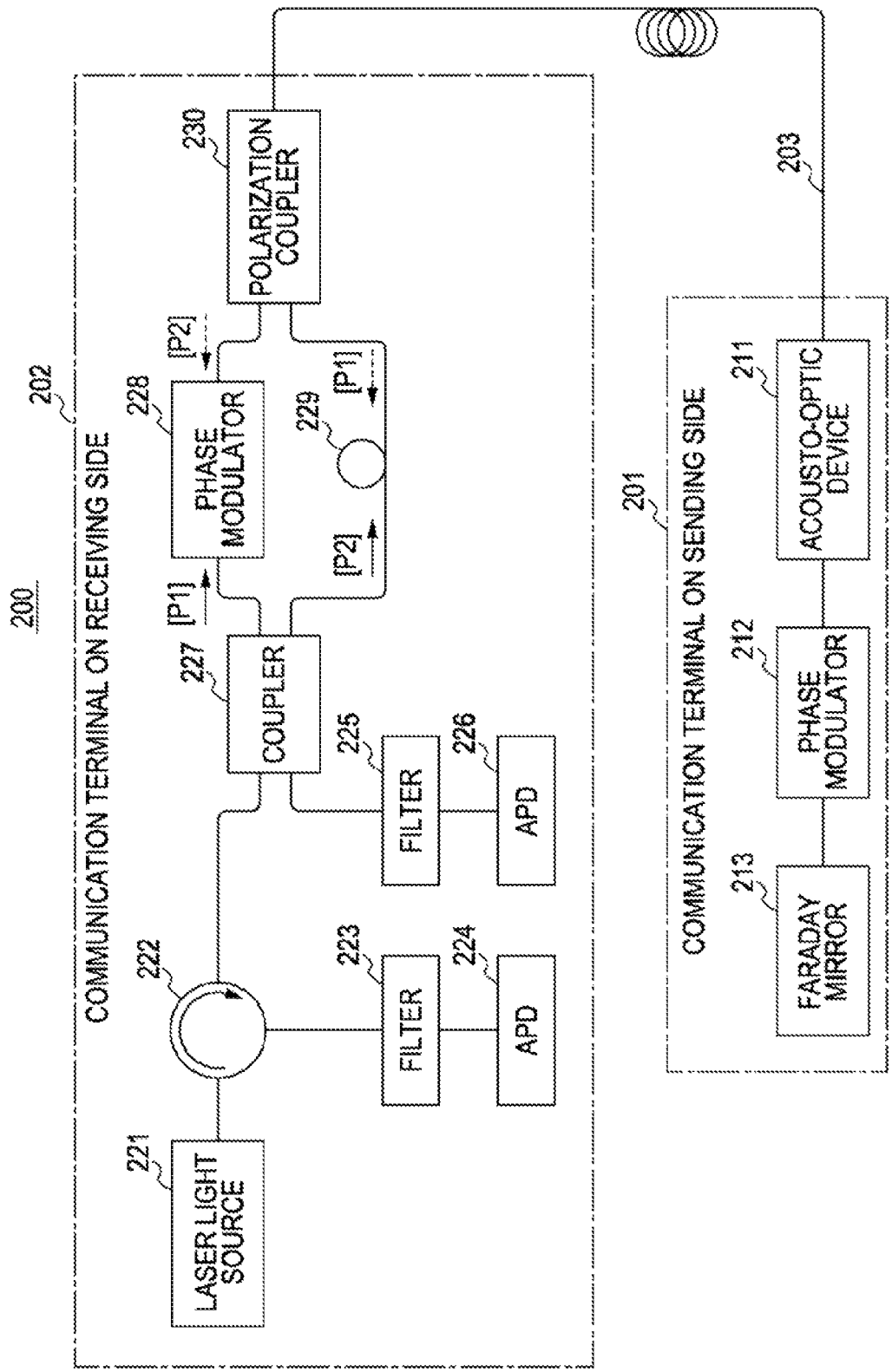
FIG. 25 is a block diagram illustrating an example of a configuration of a quantum cryptography communication apparatus (using a single-photon quantum key distribution protocol) according to an embodiment.

FIG. 25 illustrates an example of a configuration of a quantum cryptography communication apparatus 200 according to a second embodiment of the present invention. This quantum cryptography communication apparatus 200 is configured to perform quantum cryptography communication using a single-photon quantum key distribution protocol. The quantum cryptography communication apparatus 200 includes a communication terminal 201 on a sending side, a communication terminal 202 on a receiving side, and a communication channel 103 connecting the two communication terminals 201 and 202.

The communication terminal 202 on the receiving side includes a laser tight source 221, a circulator 222, filters 223 and 225, avalanche photodiodes (APD) 224 and 226, a 1:1 coupler 227, a phase modulator 228, an optical fiber delay line 229, and a polarization coupler 230. The coupler 227 functions as a light beam splitter. The phase modulator 228 functions as a first phase modulator. The optical fiber delay line 229 functions as a delay unit. The polarization coupler 230 functions as a first light beam splitting/transmitting unit. The APDs 224 and 226 function as a communication information acquisition unit. An optical path from the coupler 227 to the polarization coupler 230 via the phase modulator 228 forms a first optical path, while an optical path from the coupler 227 to the coupler 230 via optical fiber delay line 229 forms a second optical path.

The communication terminal 201 on the sending side includes an acousto-optic device 211, a phase modulator 212, and a Faraday mirror 213. The acousto-optic device 211 functions as a light attenuator, a frequency shifter, and a second light transmitting unit, and the phase modulator 212 functions as a second phase modulator.

A communication process using quantum cryptography performed by the respective parts of the quantum cryptography communication apparatus 100A is explained below. In the communication process, as described below, a light pulse is generated by the laser light source 221 in the communication terminal 202 on the receiving side and transmitted to the communication terminal 201 on the sending side via the communication channel 203, and the light pulse is returned to the communication terminal 202 on the receiving side via the communication channel 203.

The pulse light emitted from the laser light source 221 of the communication terminal 202 on the receiving side passes through the circulator 222 and is incident on the 1:1 coupler 227. The circulator 227 controls the optical path such that light from the laser light source 221 is output to the coupler 227, and light returned from the coupler 227 is output to the filter 223.

The pulse light emitted from the laser light source 221 is split by the coupler 227 into pulse light P1 and pulse light P2. The pulse light P1 output from the coupler 227 is incident on the polarization coupler 230 via the phase modulator 228. Note that the phase modulator 228 is not operated at this point of time. The pulse light P2 output from the coupler 227 is incident on the polarization coupler 230 via the delay optical fiber 229.

In the following explanation of the present embodiment, it is assumed by way of example that the pulse light P1 is signal light, the pulse light P2 is reference light, although the pulse light P1 can be reference light, the pulse light P2 can be signal light. Instead of employing the above-described configuration, the quantum cryptography communication apparatus 200 may be configured such that the delay optical fiber 229 is disposed in the same optical path as that in which the phase modulator 228 is disposed.

The pulse light P1 (hereinafter referred to as "signal light P1") and the pulse light P2 (hereinafter referred to as "reference light P2" as) are polarized such that such that as of when they are incident on the polarization coupler 230, if one of them is in a horizontally polarized state, the other one should be in a vertically polarized state. For example, the signal light P1 is horizontally polarized, while the reference light P2 is vertically polarized. The signal light P1 and the reference light P2 are input to the communication channel 203 via the polarization coupler 230. Note that because the reference light P2 is passed through the delay optical fiber 229, the signal light P1 is input to the communication channel 203 earlier than the reference light P2. In FIG. 25, the signal light P1 and the reference light P2 traveling in a direction from the communication terminal 202 on the receiving side to the communication terminal 201 on the sending side are denoted by solid-line arrows, while the signal light P1 and the reference light P2 traveling hack in a direction from the communication terminal 201 on the sending side to the communication terminal 202 on the receiving side are denoted by dotted-line arrows.

The signal light P1 and the reference light P2 transmitted from the communication terminal 202 on the receiving side are incident on the communication terminal 201 on the sending side via the communication channel 203. In the communication terminal 201 on the sending side, the signal light P1 and the reference light P2 incident from the communication channel 203 travel through the acousto-optic device 211 and, the phase modulator 212 and arrive at the Faraday mirror 213. The signal light P1 and the reference light P2 are rotated in polarization by the Faraday mirror 213 and are reflected back therefrom. The reflected signal light P1 and the reference light P2 again passes through the phase modulator 212, and the acousto-optic device 211, and are output from the acousto-optic device 211 to the communication channel 203.

In the communication terminal 201 on the sending side, the signal light P1 is attenuated by the acousto-optic device 211 and is phase-modulated by the phase modulator 212 in accordance with communication information. The signal light P1 is attenuated by acousto-optic device 211 such that the signal light P1 has, on average, for example, 0.5 photons when the signal light P1 is output from the acousto-optic device 211. The signal light P1 is phase-modulated on a pulse-by-pulse basis by the phase modulator 212 by an angle randomly selected from $\phi A \epsilon \{0, \pi/2, \pi, 3\pi/2\}$.

In the communication terminal 201 on the sending side, the frequencies of the signal light P1 and the reference light P2 are shifted upward by the acousto-optic device 211. As described above, the single acousto-optic device 211 functions as the light attenuator and the frequency shifter. This acousto-optic device 211 is configured in a similar manner to the acousto-optic device 111 of the communication terminal 101 on the sending side in the quantum cryptography communication apparatus 100 (FIG. 2).

The signal light P1 and the reference light P2 returned back from the communication terminal 201 on the sending side via the communication channel 203 are incident on the polarization coupler 230 of the communication terminal 202 on the receiving side. The polarization direction is rotated by Faraday mirror 213 of the communication terminal 201 on the sending side, and the polarization fluctuation occurring along the communication channel 203 is cancelled out when light travels along the communication channel 203 in the forward direction and then in the opposite direction. Thus, as observed immediately before the polarization coupler 230, the signal light P1 is vertically polarized while the reference light P2 is horizontally polarized.

Therefore, in the communication terminal 202 on the receiving side, the signal light P1 returned back and incident on the polarization coupler 127 is output from the polarization coupler 230 to the delay optical fiber 229, and the signal light P1 is incident on the coupler 227 via the delay optical fiber 229. On the other hand, the reference light P2 returned back to the communication terminal 202 on the receiving side is incident on the coupler 227 via the polarization coupler 230 and the phase modulator 228. The reference light P2 is phase-modulated by the phase modulator 125 on a pulse-by-pulse basis by an angle randomly selected from $\phi B \epsilon \{0, \pi/2\}$.

The two passes of the signal light P1 and the reference light P2 between the coupler 227 and the polarization coupler 230 are exchanged between in the case the signal light P1 and the reference light P2 travel from the communication terminal 202 on the receiving side to the communication terminal 201 on the sending side and in the case where the signal light P1 and the reference light P2 return from the communication terminal 201 on the sending side to the communication terminal 202 on the receiving side. As a result, the signal light P1 and the reference light P2 arrive at the coupler 227 at the same time. The signal light P1 and the reference light P2 interfere with each other in the coupler 227, and the signal light P1 and the reference light P2 are output from the two terminals of the coupler 227. One of the signal light P1 and the reference light P2 passes through the filter 225 and reaches the APD 226, while the other one passes through the circulator 222 and the filter 223 and reaches the APD 224.

In this configuration, when there is no phase difference between the signal light P1 and the reference light P2, a light pulse is output from the coupler 227 to the filter 225, while when there is a phase difference of n between the signal light P1 and the reference light P2, a pulse light is output from the coupler 227 to the circulator 222. In the case where there is a phase difference of $\pi/2$ or $3\pi/2$ between the signal light P1 and the reference light P2, a light pulse is output from the coupler 227 to the filter 225 or the circulator 222 with equal probability.

The characteristics of the filters 223 and 225 are set such that the filters have a low transmittance for pulse light generated from the laser light source 221 and for backscattered light, while the filters 223 and 225 have a high transmittance for the signal light P1 shifted in frequency by the acousto-optic device 211. That is, the filters 223 and 225 are set to have a passband corresponding to the shifted frequency band of the signal light P1 thereby to supply no undesirable light such as backscattered light to the APDs 224 and 226 serving as the single-photon detector. Communication information is extracted from the outputs of the APDs 224 and 226.

In the quantum cryptography communication apparatus 200 shown in FIG. 25, the frequencies of the signal light P1 and the reference light P2 are shifted upward by the acousto-optic device 211 in the communication terminal 201 on the sending side, and the resultant signal light P1 and the reference light P2 are returned back to the to the communication terminal 202 on the receiving side. Therefore, the frequency of the signal light P1 and that of the reference light P2 are different from the frequency of backscattered light having a frequency equal to or lower than the frequency of the original signal light P1 and reference light P2. The filters 223 and 225 are set to have a high transmittance for the signal light P1 with the shifted frequency and have a low transmittance for the backscattered light thereby to prevent the backscattered light from being incident on the APDs 224 and 226 and thus to suppress adverse effects of the backscattered light on the detection of the signal light P1.

In the quantum cryptography communication apparatus 200 shown in FIG. 25, the acousto-optic device 211 of the communication terminal 201 on the sending side functions not only as the light attenuator but also as the frequency shifter. Thus, it is not necessary to provide an additional control signal for controlling the frequency shift in addition to the control signal for controlling the light attenuation, and it is not necessary to provide excitation light for the frequency shift. Thus, the provision of the frequency shifter causes neither an increase in power consumption nor an increase in complexity of the configuration of the apparatus.

In the quantum cryptography communication apparatus 200 shown in FIG. 25, the acousto-optic device 211 in the communication terminal 101 on the sending side functions not only as the light attenuator but also as the frequency shifter. Thus, the frequency shifter for shifting the frequencies of the signal light P1 and the reference light P2 can be realized without increasing the number of optical elements disposed in the optical path and thus without causing an additional increase in fluctuation in the transmittance which can cause degradation of the performance quantum cryptography carried by low-increase light.

It should be understood that various changes and modifications to the presently preferred embodiments described herein will be apparent to those skilled in the art. Such changes and modifications can be made without departing from the spirit and scope of the present subject matter and The invention is claimed as follows:

1. A quantum cryptography communication apparatus adapted to perform a communication process based on quantum cryptography, the quantum cryptography communication apparatus comprising:
   a communication terminal on a receiving side;
   a communication terminal on a sending side; and
   a communication channel connecting the communication terminal on the receiving side and the communication terminal on the sending side,
   the communication terminal on the receiving side including:
   (a) a light source adapted to generate a light pulse,
   (b) a light beam splitter adapted to split the light pulse into a signal light and a reference light,
   (c) a first optical path,
   (d) a second optical path,
   (e) a delay hardware unit disposed in the first optical path or the second optical path,
   (f) a first light transmitting hardware unit adapted to transmit the signal light and the reference light over the communication channel, the signal light having been output from the light beam splitter and having been passed via the first path, the reference light having been output from the light beam splitter and having been passed via the second optical path,
   (g) a light hardware separator adapted to:
      (i) receive the signal light and the reference light transmitted from the communication terminal on the sending side via the communication channel; and
      (ii) separate the received signal light and reference light from each other,
   (h) a first phase hardware modulator adapted to perform random phase modulation, on a pulse-by-pulse basis, on the reference light output from the light hardware separator and passing via the first optical path or the signal light output from the light hardware separator and passing via the second optical path, and
   (i) a communication information acquisition hardware unit adapted to acquire communication information based on:
      (i) the reference light output from the light hardware separator and passed via the first optical path; and
      (ii) the signal light output from the light hardware separator and passed via the second optical path,
   the communication terminal on the sending side including:
   (a) a second light transmitting hardware unit adapted to transmit the signal light and the reference light, received from the communication terminal on the receiving side via the communication channel, over the communication channel via a particular optical path,
   (b) a single acousto-optic device including:
      (i) a frequency hardware shifter adapted to shift frequencies of the signal light and the reference light passing via the particular optical path, and
      (ii) a light hardware attenuator adapted to attenuate an intensity level of the signal light passing via the particular optical path, and
   (c) a second phase hardware modulator adapted to perform phase modulation corresponding to the communication information, on a pulse-by-pulse basis, on the signal light passing via the particular optical path.

2. The quantum cryptography communication apparatus of claim 1, wherein the frequency hardware shifter is adapted to upwardly shift the frequencies of the signal light and the reference light.

3. The quantum cryptography communication apparatus of claim 1, wherein the communication information acquisition hardware unit acquires the communication information by performing homodyne detection using a homodyne detector on the signal light and the reference light.

4. The quantum cryptography communication apparatus of claim 3, further comprising a hardware filter disposed on a light incidence side of the homodyne detector, the hardware filter having a passband corresponding to a frequency band, shifted upward by the frequency hardware shifter, of the signal light and the reference light.

5. The quantum cryptography communication apparatus of claim 1, wherein
   the communication information acquisition hardware unit acquires the communication information by performing a single-photon detection process using a single-photon detector on the signal light and the reference light,
   and wherein the quantum cryptography communication apparatus further comprises a hardware filter disposed on a light incidence side of the single-photon detector, the hardware filter having a passband corresponding to a frequency band, shifted upward by the frequency hardware shifter, of the signal light and the reference light.

6. The quantum cryptography communication apparatus of claim 1, wherein the width, T, of the light pulse generated by the light source and the frequency shift, fa, performed by the frequency hardware shifter are set such that Tfa is equal to an integer.

* * * * *